(12) United States Patent
Akiona et al.

(10) Patent No.: US 12,083,050 B1
(45) Date of Patent: Sep. 10, 2024

(54) ADJUSTABLE TABLE SYSTEM

(71) Applicant: Aescape, Inc., New York, NY (US)

(72) Inventors: Nicholas Akiona, New York, NY (US); Eric A. Litman, Brooklyn, NY (US); Kathleen Lockhart, Bow, NH (US); Jason Poure, Hastings-on-Hudson, NY (US)

(73) Assignee: Aescape, Inc., New York, NY (US)

( * ) Notice: Subject to any disclaimer, the term of this patent is extended or adjusted under 35 U.S.C. 154(b) by 0 days.

(21) Appl. No.: 18/242,999

(22) Filed: Sep. 6, 2023

(51) Int. Cl.
| | | |
|---|---|---|
| *A61G 13/00* | (2006.01) | |
| *A61G 13/08* | (2006.01) | |
| *A61G 13/12* | (2006.01) | |
| *B25J 13/00* | (2006.01) | |
| *B25J 11/00* | (2006.01) | |

(52) U.S. Cl.
CPC .......... *A61G 13/08* (2013.01); *A61G 13/009* (2013.01); *A61G 13/121* (2013.01); *A61G 13/122* (2013.01); *B25J 13/006* (2013.01); *B25J 11/008* (2013.01)

(58) Field of Classification Search
CPC .. A61H 2201/0138; A61G 7/07; A61G 7/072; A61G 13/009
See application file for complete search history.

(56) References Cited

U.S. PATENT DOCUMENTS

| | | | | |
|---|---|---|---|---|
| 10,792,123 B2* | 10/2020 | Wang | .................. | A61B 90/361 |
| 11,197,799 B2* | 12/2021 | Tian | ........................ | A61H 39/02 |
| 11,207,233 B2* | 12/2021 | Savich | ................. | A61G 13/009 |
| 11,475,630 B2* | 10/2022 | Tian | ........................ | A61B 5/389 |
| 11,488,592 B2* | 11/2022 | Kim | ...................... | A61H 23/006 |
| 11,571,351 B2* | 2/2023 | Du | .......................... | A47C 9/005 |
| 11,633,317 B2* | 4/2023 | Whipple | ............ | A61G 13/1275 5/613 |
| 2001/0014781 A1 | 8/2001 | Nissim | | |
| 2017/0266077 A1* | 9/2017 | Mackin | ............. | A61G 13/1235 |
| 2020/0126297 A1 | 4/2020 | Tian | | |
| 2020/0281805 A1 | 9/2020 | Qiu | | |
| 2021/0154852 A1 | 5/2021 | Eyssautier | | |
| 2021/0155136 A1 | 5/2021 | Kim | | |
| 2022/0234210 A1 | 7/2022 | Inada | | |
| 2022/0296449 A1* | 9/2022 | Martin | ............... | B01D 39/1623 |
| 2022/0387239 A1* | 12/2022 | Kiser | ..................... | A61G 13/04 |

(Continued)

FOREIGN PATENT DOCUMENTS

| | | |
|---|---|---|
| CN | 115870952 | 3/2023 |
| CN | 115972202 | 4/2023 |
| WO | 2021116554 | 6/2021 |

OTHER PUBLICATIONS

Author Unknown, Model 850, Comfort Craft, 2018, https://web.archive.org/web/20180829032204/http://comfortcraft.com/cc-model-850.html.

(Continued)

*Primary Examiner* — LaToya M Louis
(74) *Attorney, Agent, or Firm* — Van Pelt, Yi & James LLP

(57) ABSTRACT

A system that includes a processor, a bolster, a headrest, and an arm interface where the processor receives an input associated with configuring at least one of the bolster, the headrest, or the arm interface. The processor generates a control signal based at least in part on the input and controls an actuator using the control signal to adjust a configuration of the at least one of the bolster, the headrest, or the arm interface.

14 Claims, 18 Drawing Sheets

(56) References Cited

U.S. PATENT DOCUMENTS

| | | | | |
|---|---|---|---|---|
| 2022/0388165 | A1* | 12/2022 | Walsh | B25J 9/1679 |
| 2022/0388168 | A1* | 12/2022 | Litman | A61B 34/32 |
| 2022/0414291 | A1* | 12/2022 | Eyssautier | G06F 3/014 |
| 2023/0053326 | A9* | 2/2023 | Du | A47C 4/04 |
| 2023/0181403 | A1* | 6/2023 | Kusens | A61G 13/121 |
| | | | | 5/638 |

OTHER PUBLICATIONS

James Mckenzie, The 10 Best Electric Massage Tables, Ergonomics Health Association, Sep. 27, 2020, https://ergonomicshealth.com/electric-massage-tables/.

* cited by examiner

> US 12,083,050 B1

ADJUSTABLE TABLE SYSTEM

BACKGROUND OF THE INVENTION

The benefits of massage therapy have been known for many years. However, recent progress in the field has been stagnant and the field is ripe for new massage therapy techniques. New systems and/or techniques that perform massage therapy techniques would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of an adjustable table system are described herein. In some embodiments, a massage recipient lies on the adjustable table system to receive massage therapy (sometimes referred to herein more simply as a massage) and the adjustable table system is an adjustable massage table system. The following figure describes one embodiment of a process (e.g., performed by a (massage) table configuration controller in an adjustable table system) to configure the adjustable table system.

Figure 1:
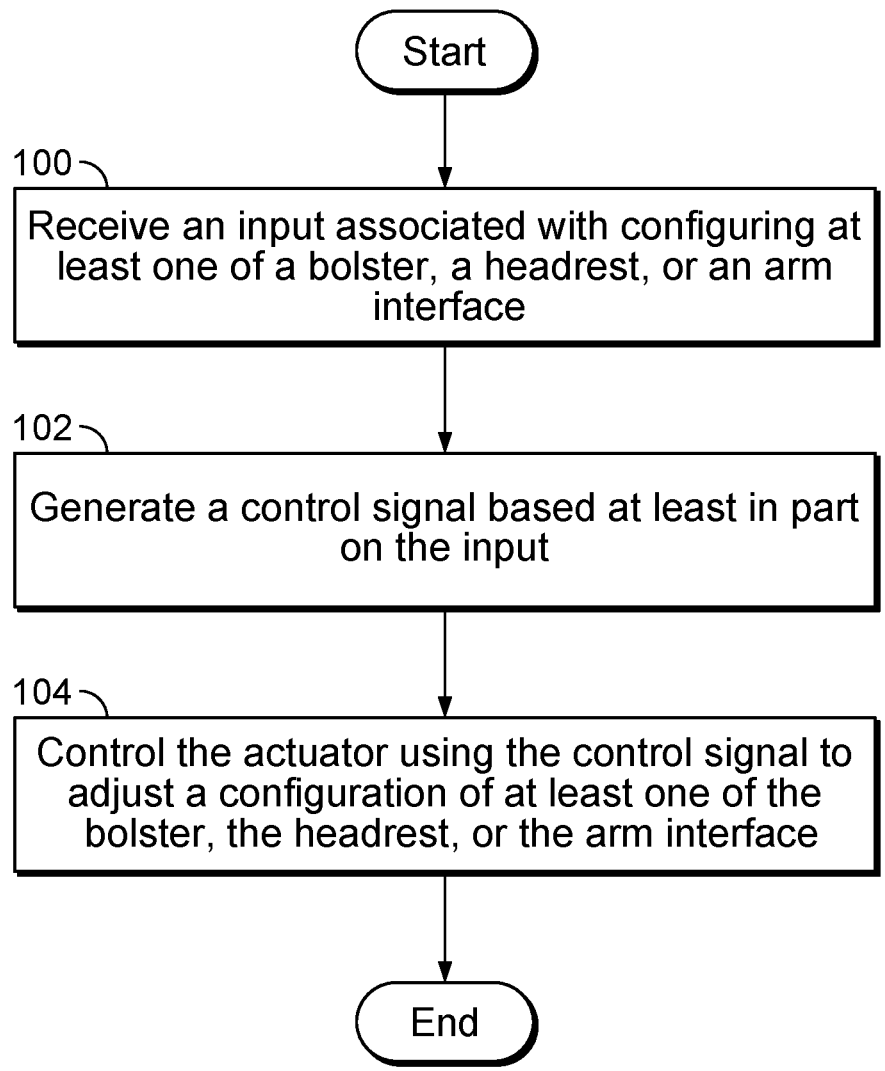
FIG. 1 is a diagram illustrating an embodiment of a process to set an adjustable table system at settings that are comfortable for a subject and/or expose a targeted body part.

FIG. 1 is a diagram illustrating an embodiment of a process to set an adjustable table system at settings that are comfortable for a subject and/or expose a targeted body part. In some embodiments, the adjustable table system is used in a massage setting, where a massage recipient lies on the adjustable massage table system and receives a massage from a massage therapist. In some embodiments, an adjustable massage table system includes one or more robotic arms that enable the adjustable massage table system to perform an automated massage without a massage therapist present.

At 100, an input associated with configuring at least one of a bolster, a headrest, or an arm interface is received. In one example of what body parts the various components support and/or come into contact with, the bolster supports the back of the knees in supine position, or the front of the ankles in prone position. The arm interface is in contact with some part of the arm (e.g., an armrest that a massage recipient rests their forearms and hands on, two independent hand grips or hand rests, etc.), and the headrest supports the head (e.g., the back of the head in supine position or the face in prone position). More detailed examples of bolsters, headrests, and arm interfaces are described below. Initially, everything may begin in an initial and/or default position or state.

At 102, a control signal is generated based at least in part on the input.

In some embodiments, the input received at step 100 includes user input (e.g., received via a user interface, such as a touchscreen) and generating the control signal at step 102 is based at least in part on the user input. In some embodiments, an adjustable table system is controlled entirely by the user (i.e., there is no automated configuration or adjustment using sensors). Alternatively, in some other embodiments, an adjustable table system offers both user-controlled adjustment as well as automated adjustment using sensors.

In some embodiments, the input received at step 100 includes sensor information from one or more sensors that scan, weigh, or otherwise measure a massage recipient or subject. For example, the sensor information may be from a depth-sensing camera, a scale, an infrared sensor, etc. In such embodiments, step 102 includes generating the control signal based at least in part on the sensor information.

In some embodiments, the input received at step 100 includes configuration information associated with an automated massage sequence. For example, in some embodiments, an adjustable massage table system includes one or more robotic arms that are controlled by an automated massage controller that generates or otherwise determines an automated massage sequence for the massage recipient and then controls the robotic arms to go through the massage treatments in the automated massage sequence. Depending upon the targeted body part for a given massage treatment in the automated massage sequence, an adjustable massage table system may need to be reconfigured (e.g., when the massage recipient switches from a massage treatment in a prone position to a massage treatment in the supine position or vice versa). An automated massage controller may know when a prone-to-supine reconfiguration of the table should occur and passes configuration information associated with an automated massage sequence to a massage table configuration controller at the appropriate time and/or point in the automated massage sequence. At step 102 in such embodiments, the control signal is generated based at least in part on the configuration information associated with the automated massage sequence.

In some embodiments, the input received at step 100 includes a user credential (e.g., an email address, a telephone number, a username, an account number, etc.) and generating the control signal at step 102 includes retrieving a stored setting, wherein the control signal is generated using the stored setting. For example, the stored setting may be the control signal itself, or the control signal is (re-)generated from the stored setting (e.g., stored sensor information, such as the weight and/or height of the massage recipient).

At 104, the actuator is controlled using the control signal to adjust a configuration of at least one of the bolster, the headrest, or the arm interface. For example, in massage applications, depending upon the massage recipient's body shape (e.g., height, weight, neck length, head shape, arm length, etc.) as well as the targeted body part, different configurations and/or placements of the bolster, the headrest, and/or the arm interface will be comfortable for the massage recipient and be appropriate for the body part being massaged. To put it another way, one objective or result of the process described above is to put the adjustable massage table system into a configuration that is comfortable for the massage recipient lying on the platform (at least in some embodiments). Another objective or result of the process is to put the massage recipient into a position that exposes and/or makes accessible the treated body part (at least in some embodiments).

The process of FIG. 1 may be performed at various times or states, for example initially, before a massage has started, as well as during the massage (e.g., because the massage recipient is getting uncomfortable or because the automated massage sequence requires a reconfigured table to accommodate a change in the position of the massage recipient for that massage treatment in the sequence). One benefit of an adjustable massage table system is that it does not require a massage therapist (if present) to stop the massage to adjust the table. For example, many massage tables have no actuators and must be manually adjusted or otherwise reconfigured by the massage therapist. If the massage recipient becomes uncomfortable due to the configuration of the massage table during the massage, the massage therapist must stop the massage and adjust the table, which is undesirable.

Another benefit to the adjustable table system described herein is that the adjustable components (e.g., the bolster, the arm interface, the headrest, etc.) are adjustable or configurable in ways that other table systems are not. For example, other massage tables may have headrests with a single degree of freedom (e.g., other headrests can tilt around a horizontal axis of rotation but those headrests cannot also be lifted or lowered along a vertical axis) whereas at least some of the headrest embodiments described herein have three degrees of freedom (e.g., the headrest can tilt around a horizontal axis of rotation, can be extended outward and inwards along a longitudinal axis, and can be lifted up and down along a vertical axis). This enables the adjustable table system described herein to have new configurations that provide a more comfortable experience for subjects.

Another benefit of the adjustable table system described herein is that it can be adjusted or configured so that a subject's body is manipulated or positioned so a body part of interest (i.e., a targeted body part) is accessible. For example, there are some muscles in the shoulder or back that are hidden by bone (e.g., when the arms are in a neutral position, such as when the arms are at the side of the torso). To expose these muscles (e.g., to a massage therapist or robotic arms), the arms of the subject must be in a certain position. The adjustable massage table system may be configured to put the massage recipient into such a position that exposes a body part for treatment. For example, at least one of the figures below shows an arm interface with two independent pieces so that a subject's arms can be (as an example) crossed, be in parallel, or spread apart and/or with elbows bent or elbows straight, thus exposing different muscles or other parts of the body. In contrast, other massage tables are not able to position a massage subject so that such hidden muscles are exposed (e.g., because components in those other tables do not have sufficient degrees of freedom and/or a sufficient range of motion necessary).

Although some massage-related examples are described herein, it is noted that an adjustable table system is not necessarily limited to massage-related applications. For example, the adjustable table system described herein may be used in medical applications, in a clinical setting, for therapy (e.g., physical or occupational), in tattoo parlors, and so on.

The following figures describe various embodiments of an adjustable table system. First, some examples of adjustable massage table systems that may be used in applications where a massage therapist provides the massage are described. Then, some examples of adjustable massage table systems with (e.g., attached) robotic arms are described where a robotic massage is provided without a massage therapist being present.

Figure 2:
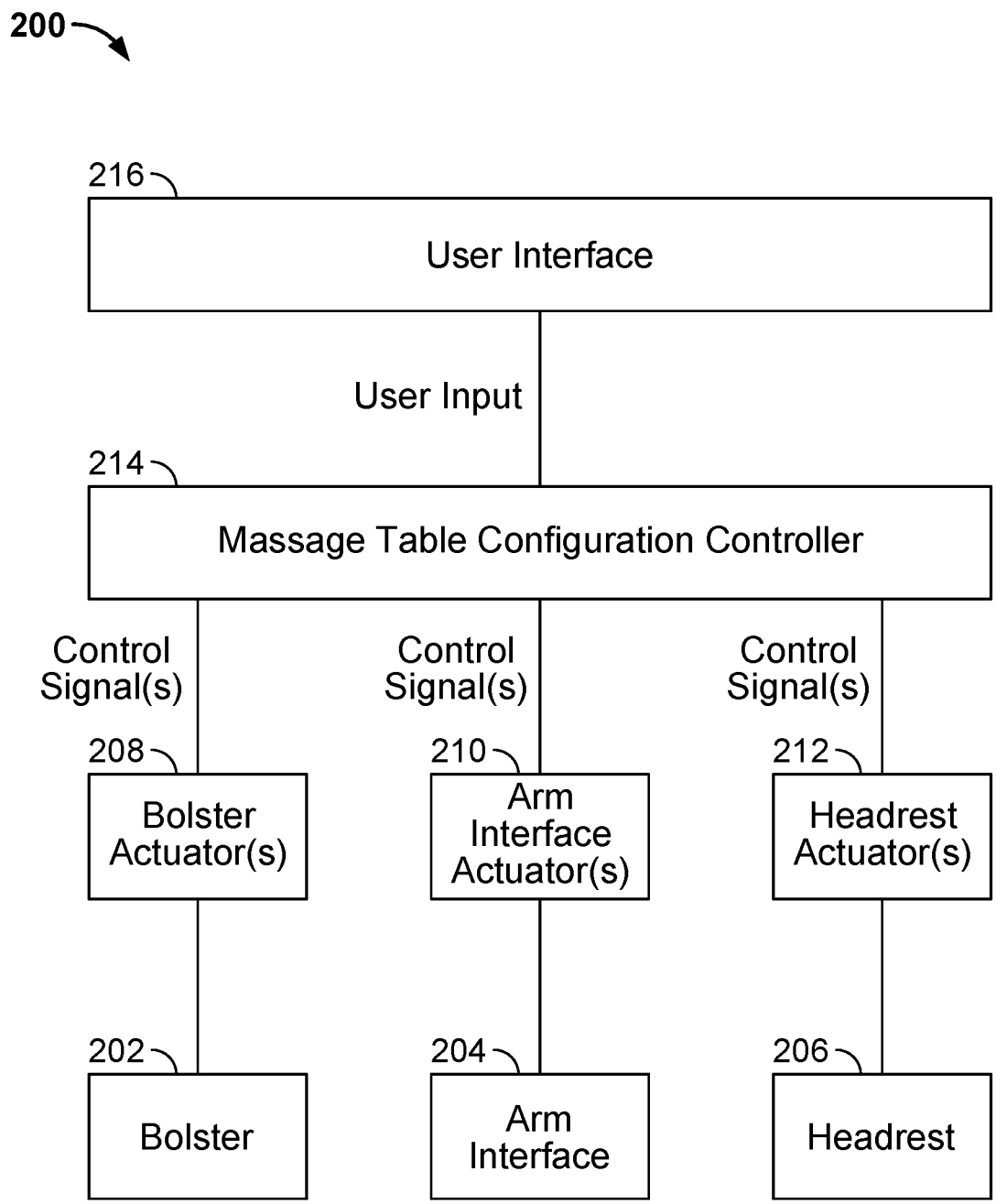
FIG. 2 is a block diagram illustrating an embodiment of an adjustable massage table system.

FIG. 2 is a block diagram illustrating an embodiment of an adjustable massage table system. In this example, the adjustable table system (200) is used in a massage application and is one example of a system that performs the process of FIG. 1. In this example, the adjustable massage table system (200) includes a bolster (202), an arm interface (204) such as an arm rest, and a headrest (206). Each of these components is independently adjustable so that there are one or more bolster actuators (208), one or more arm interface actuators (210), and one or more headrest actuators (212).

In this example, the adjustable massage table system (200) includes a user interface (216), such as a touchscreen, via which a user provides user input associated with the placement or positioning of the bolster (202), arm interface (204), and headrest (206) to the system. The massage table configuration controller (214) uses this user input (at least in this example) to generate control signal(s) for the actuators (208, 210, and 212) which in turn control the configuration (e.g., angular rotation and/or linear movement) of the bolster (202), the arm interface (204), and/or the headrest (206).

The following figure illustrates one example of a display presented in a touchscreen via which user input is received. For example, user input may be received via such a display to control the actuators (e.g., 208, 210, and/or 212) to adjust the position and/or configuration of the bolster (202), arm interface (204), and/or headrest (206).

Figure 3:
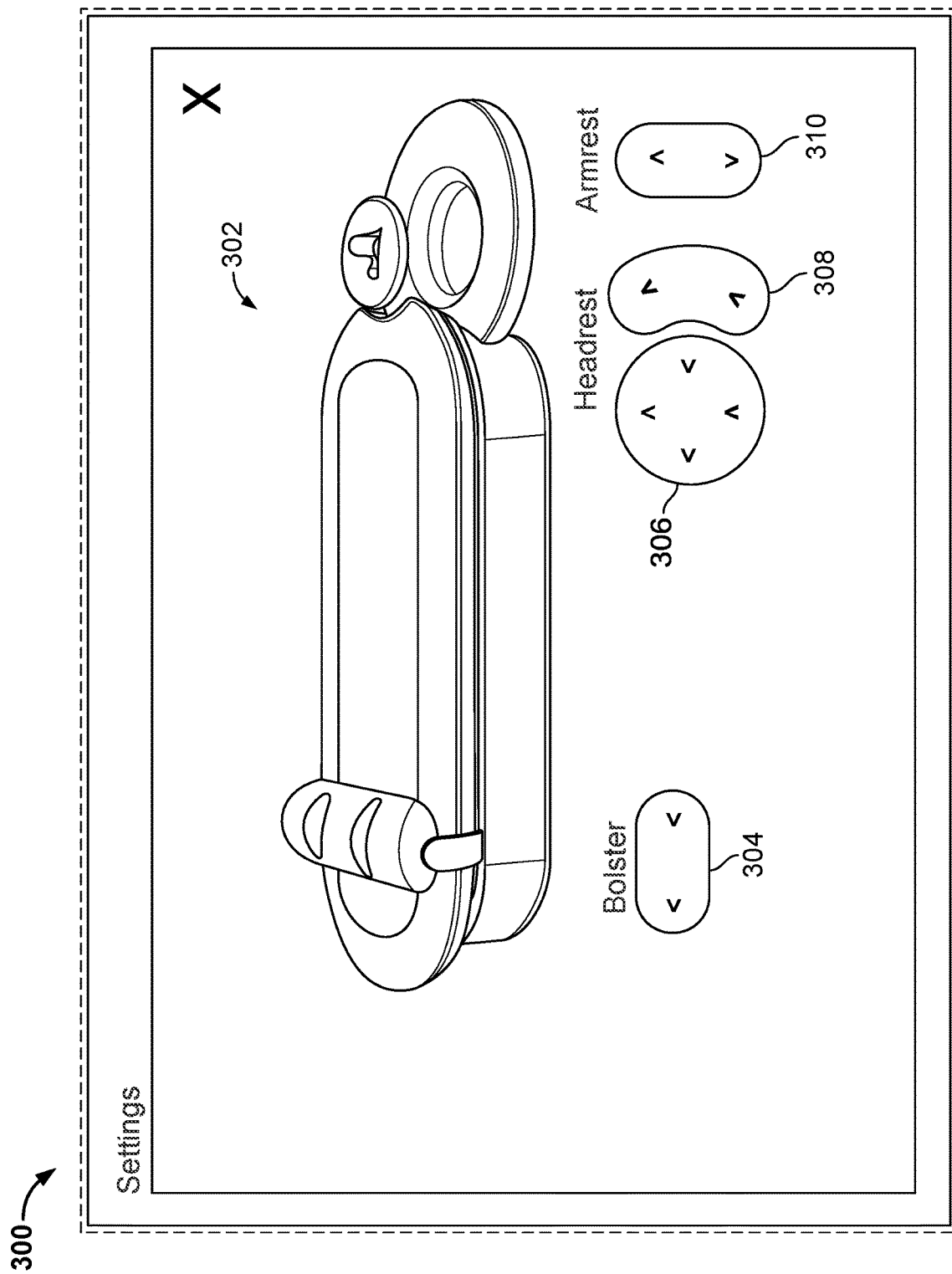
FIG. 3 is a diagram illustrating an embodiment of a display presented in a touchscreen via which user input is received to configure an adjustable massage table system.

FIG. 3 is a diagram illustrating an embodiment of a display presented in a touchscreen via which user input is received to configure an adjustable massage table system. In this example, the display (300) is presented in a touchscreen (e.g., located in the center of a ring-shaped armrest). The display (300) includes an image of the adjustable massage table system (302), a left-and-right button (304) for the bolster, a button with up, down, left, and right controls (306), and also a curved (e.g., tilt) up-and-down button (308) for the headrest, and an up-and-down button (310) for the armrest.

The example (e.g., ergonomic) controls shown in FIG. 3 (such as buttons 304, 306, and 308) are merely exemplary and are not intended to be limiting. In some embodiments, adjustable components of automated massage system are adjusted or otherwise configured using a one-click control to move one or more adjustable components to preset position(s). In some such embodiments, there is a dead man's switch (e.g., to move the robotic arms out of the way and/or adjust the platform height so that an unconscious user can more easily be removed). In some embodiments, a one-click control is predetermined based on users with a similar body type or from previous settings. In some embodiments, a component can be adjusted using a jog commands (i.e., press and hold to move). In some embodiments, components can be adjusted using configurable speed and/or acceleration of motion (e.g., some users may prefer faster or lower adjustments).

In some embodiments, an adjust occurs during, or as part of, an automated massage to provide better access to a muscle or other body part during the automated massage. For example, an armrest, bolster, or other adjustable component may be (e.g., strategic) moved to improve the quality of the massage treatment. Proper positioning of muscles (as an example) is important for being able to treat pain and tension. Over the course of an automated massage, different (e.g., ergonomic) settings and/or configurations may be employed to treat muscles more effectively.

As an example, consider the positioning of the armrest. Lifting an armrest beyond a certain height can cause the shoulder blades to pull more closely together and/or towards the spine. This reduces the degree or amount of muscle stretching, thereby allowing the system to perform what would otherwise be too intense treatment (e.g., if the muscles were stretched out more). A high(er) armrest position also allows for stretching the muscles in different manners and/or using different stroke types during the automated massage. Conversely, such a position exposes less surface area (e.g., because it pulls the shoulder blades closer together). As such, it is good for some types of massage work or strokes but less ideal for other types of work or strokes, such broader effleurages. The tension in a user's muscles may also change over the course of the massage (e.g., as knots are worked out), changing an optimal and/or preferred positioning of the various adjustable components.

In some embodiments, components are adjusted during automated massage to support or otherwise perform active release therapy. In active release therapy, a person's body and/or joints are moved or otherwise adjusted while massaging the surrounding muscles. This dynamic work has been shown to be an effective method of treatment. In some embodiments, by adjust or moving (e.g., one of) the robotic arms and/or other attachments, the joints or other body parts of a user are positioned or adjusted while the surrounding muscles are massaged (e.g., by the other robotic arm).

In one active release therapy example, while applying a deep compression hold to the upper back and/or trapezoid muscles, the position of the headrest is adjusted slightly. This can be used to encourage and/or increase motion in the joints of the spine and/or neck. Similarly, the position of the armrest could be adjusted to improve motion of the shoulder and/or scapula. In another active release therapy example, while massaging the hamstrings, the system can coordinate movement with some adjustment of the bolster to alter the angle of the knee during the massage stroke.

The following figures illustrate some example exterior views of an adjustable massage table system.

Figure 4A:
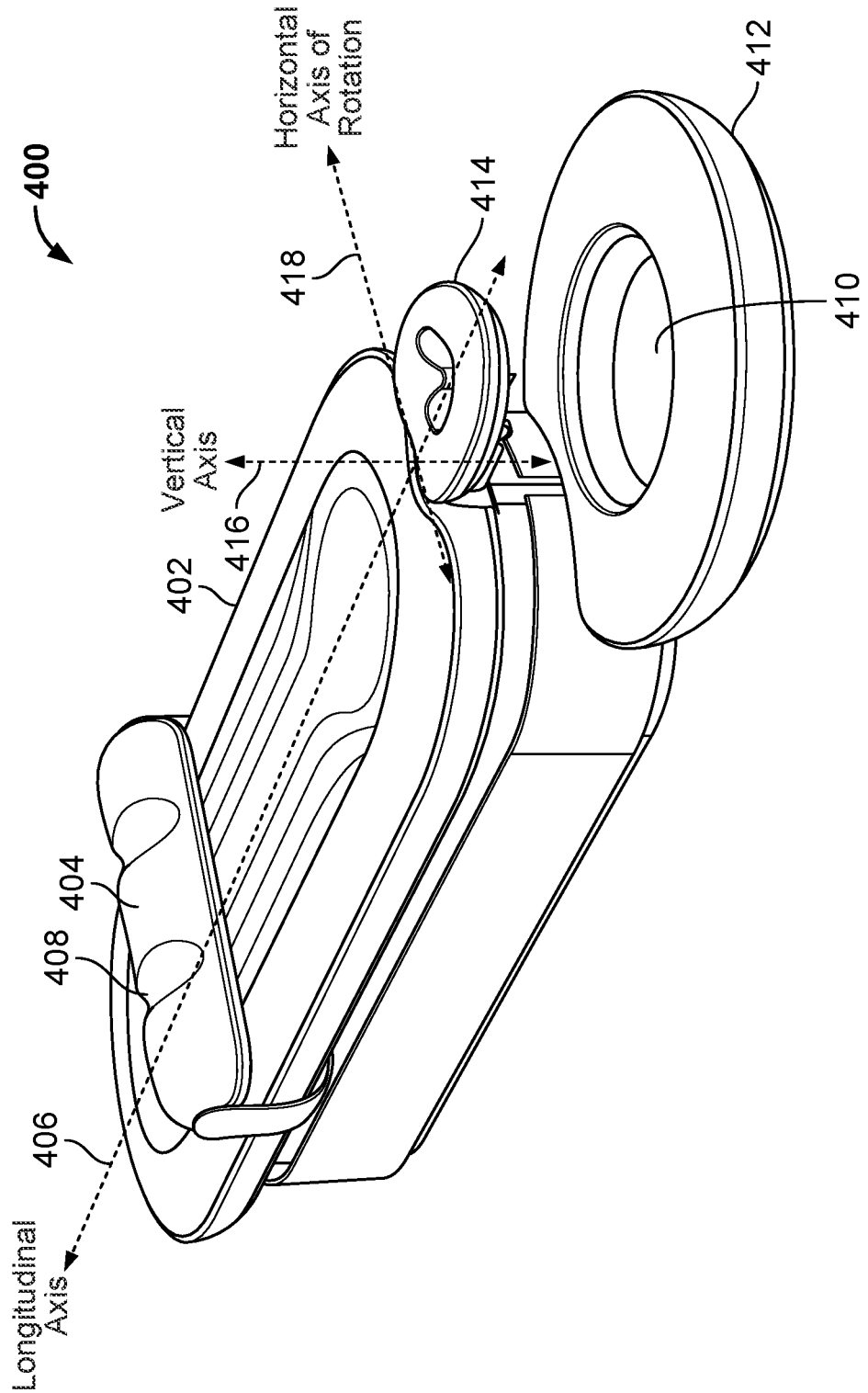
FIG. 4A is a diagram illustrating an embodiment of an adjustable massage table from a perspective view.

FIG. 4A is a diagram illustrating an embodiment of an adjustable massage table from a perspective view. In this example, the adjustable massage table system (400) includes a platform (402), sometimes referred to as a bed or a table, that a massage recipient or subject lies down on. At various times or stages during the massage, the massage recipient may either lie on the platform (402) in a prone position or a supine position to expose or otherwise make accessible the targeted body part being worked on by a massage therapist.

In this example, the bolster (404) is adjustable or movable along the longitudinal axis (406) of the adjustable massage table system (400). The position of the bolster (404) depends at least in part on the position (e.g., prone vs. supine) of the massage recipient. When the massage recipient is in a prone position, the bolster (404) is adjusted (at least in this example) so that the bolster is beneath or otherwise supports the front of the massage recipient's ankles. When the massage recipient is in a supine position, the bolster (404) is moved along the longitudinal axis (406) so that the bolster is beneath or otherwise supports the back of the massage recipient's knees.

In this example, the bolster (404) includes two divots, cutouts, or indentations (408) to help the massage recipient position their knees or ankles on the bolster and/or provide a more comfortable interface that cradles the knees or ankles. The divots (408) also enable more consistent positioning of a user's legs. For example, this is useful and/or important to be able to reach the interior of the legs. The divots (408) also provide lateral support when pressing on the outside of a leg, thereby helping to prevent a leg from sliding.

In this example, the bolster (404), the headrest (414), and armrest (412) are all controllable or otherwise adjustable via a touchscreen (410) in the center of the ring-shaped armrest (412). In some embodiments, the touchscreen (410) includes a computing device such as a tablet that can input user commands (e.g., to position various components of the adjustable massage table) and output or otherwise display massage instructions, massage narration, or other information.

The headrest (414) in this example is moveable (e.g., up and down) along a vertical axis (416). The headrest (414) is also moveable (e.g., forward and backward) along a longitudinal axis (406) and is rotatable (e.g., tilt up or tilt down) around a horizontal axis of rotation (418). For example, the massage recipient can adjust the headrest (414) using the touchscreen (410) located in the center of the armrest (412).

In this example, the arm interface is a ring-shaped armrest (412) where the massage recipient rests their forearms (e.g., from the elbow to the wrist) as well as their hands on the ring-shaped arm rest. The ring-shaped armrest (412) can be raised or lowered along the vertical axis (416).

In some embodiments, the adjustable massage table system (400) also includes a speaker (not shown), to provide audible instructions or information related to the massage, music, communication from an attendant (e.g., not in the room), and so on. The touchscreen (410) shown here is merely exemplary and is not intended to be limiting. Some other embodiments of a user interface (e.g., for receiving and/or displaying information) include joysticks, 3D mice, microphones, buttons (e.g., dedicated physical ones or virtual ones presented on a touchscreen), game controllers, handheld remotes, etc.

In some embodiments, a massage recipient starts in a prone position so that they can access the touchscreen (410) and adjust the components of the adjustable massage table (400) as desired. In some cases, the massage recipient starts in a supine position where the touchscreen (410) is not easily accessible and/or visible. In some such embodiments, the massage recipient configures the components of the adjustable massage table (400) using voice commands and/or a tablet.

As shown in FIG. 4A, in some embodiments, a headrest (e.g., 414) is linearly moveable along a longitudinal axis (e.g., 406), is linearly moveable along a vertical axis (e.g., 416), and is rotatable about a horizontal axis of rotation (e.g., 418).

As shown in FIG. 4A, in some embodiments, the arm interface includes a ring-shaped armrest with a touchscreen in the center of the ring-shaped armrest.

Figure 4B:
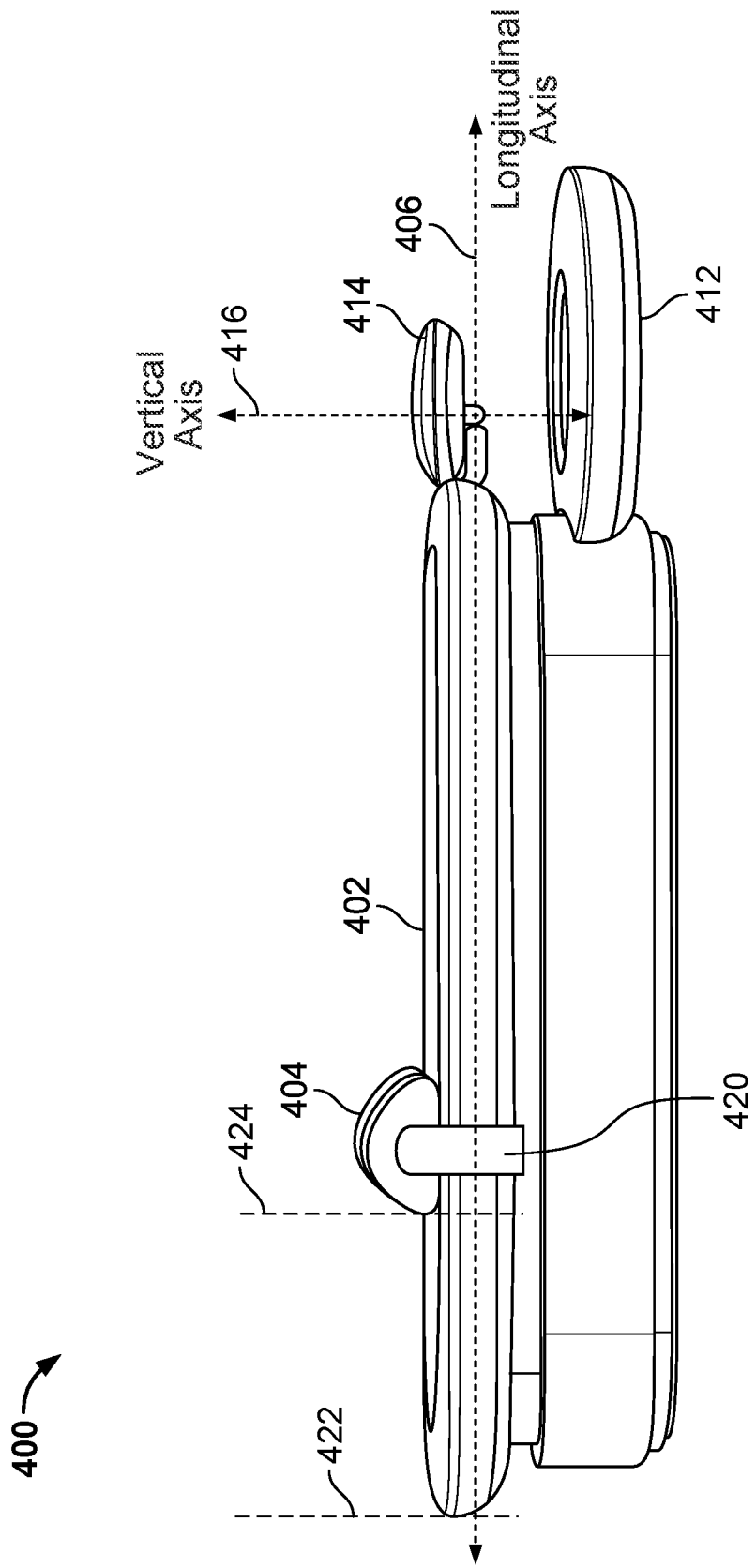
FIG. 4B is a diagram illustrating an embodiment of an adjustable massage table system from a side view.

FIG. 4B is a diagram illustrating an embodiment of an adjustable massage table system from a side view. FIG. 4B shows an alternate view of the adjustable massage table system (400) shown in FIG. 4A and uses the same reference numbers as FIG. 4A. From this side view, the platform (402), bolster (404), longitudinal axis (406), ring-shaped armrest (412), headrest (414), and vertical axis (416) are visible.

From this view, the bolster connector (420) that wraps around the side of the platform (402) is more readily visible. In this example, there is a linear rail (not shown) inside the platform (402). One end of the bolster connector (420) connects to this linear rail and the bolster (404) is movable along the longitudinal axis (406) using the linear rail. This manner of attaching the bolster (404) to the rest of the adjustable massage table system (400) is attractive because it prevents dust and/or debris from falling into the linear rail or other moving components, which is undesirable. An earlier prototype (not shown) of the adjustable massage table system had a channel in the middle of the top surface of the platform, which exposed the linear rail; it was observed that dust and/or debris would collect in the exposed linear rail. In contrast, because the linear rail is inside the body of the platform (402) and the top surface of the platform (402) is a continuous surface that shields the linear rail, the linear rail and other sensitive components are protected. In some embodiments, a motor controller stage (e.g., that adjusts a bolster) includes something other than a linear rail, such as a belt-driven, ballscrew, etc.

In some embodiments, the bolster (404) is removable or otherwise detachable so that it is easier to clean the platform (402).

In some embodiments, a component is attached to an adjustable massage table system via one or more magnets and the component is moveable or adjustable using the magnets. For example, instead of using a linear rail inside the body of the platform (402) to connect and move the bolster (404), magnets may be placed near the top surface of the platform beneath the exterior covering (and possibly beneath padding, for comfort). The magnets may be moved up and down along the longitudinal axis and the magnetic field causes the bolster (404) to correspondingly move. This would also eliminate the bolster connector (420).

During the design phase, testing was performed with test subjects having a variety of body shapes, heights, and weights in order to determine what minimum and maximum values (which in turn define a range of motion) to support or provide for a comfortable experience using the adjustable massage table system (400). The following table shows an example of minimum, maximum, and range of motion values supported by an example adjustable massage table system.

TABLE 1

Example minimum, maximum, and range of motion values collected from test subjects having a range of body shapes, heights, and weights. These values show one example of values and/or ranges that may be supported by an adjustable massage table system.

| Component Displacement | Relevant Axis | Minimum, Maximum, and Range of Motion | Comments |
| --- | --- | --- | --- |
| Armrest Height | Vertical Axis | Minimum: 6 inches<br>Maximum: 14 inches<br>Range of Motion: 8 inches | Measured from top surface of platform to top surface of armrest. |
| Bolster Position | Longitudinal Axis | Minimum: 8 inches<br>Maximum: 48 inches<br>Range of Motion: 40 inches | Measured from bottom/foot end of platform (e.g., 422 in FIG. 4B) to bottom/foot end of bolster (e.g., 424 in FIG. 4B). |
| Headrest Height | Vertical Axis | Minimum: −11 mm<br>Maximum: 20 mm<br>Range of Motion: 41 mm | Measured from top surface of platform to chinrest area on top surface of headrest (see, e.g., FIGS. 5B and 5C). |
| Headrest Extension | Longitudinal Axis | Minimum: −110 mm<br>Maximum: 12 mm<br>Range of Motion: 41 mm | Measured from end of platform (e.g., bottom of cutout) to end of headrest (see, e.g., FIGS. 5B and 5C). |
| Headrest Tilt Angle | Horizontal Axis of Rotation | Minimum: −6°<br>Maximum: 6°<br>Range of Motion: 12° | Pivot point is midpoint/center of headrest; 0° = mount plate is parallel to ground; positive value = forehead down and chin up; negative value = forehead up and chin down (see, e.g., FIGS. 5B and 5C). |

From the configurations and/or settings collected from the test subjects, it was observed that armrest height tended to depend upon the height and arm length of the test subject, with a stronger and/or more obvious correlation for taller people. From the data collected during testing, a minimum armrest height of 6 inches and a maximum armrest height of 14 inches was selected to satisfy most or all of the test subjects.

It was observed from testing that people place their arms differently on the armrest (412) so there was up to a 1-inch difference in armrest height for test subjects having the same height. Also, test subjects with longer arms tended to angle their arms out and place their elbows on the widest part of the armrest. As a result, a relatively small range of motion (in this example, 8 inches) in the armrest height was sufficient to accommodate all of the test subjects.

When in the prone position, there was a strong correlation between a test subject's height and the bolster position. In the prone position, the minimum bolster position measured (e.g., from the configurations and/or settings selected by the test subjects) was 8 inches and the maximum bolster position was 48 inches.

When in the supine position, there was (also) a strong correlation between a test subject's height and the bolster position but it was noted that the test subjects were less sensitive to bolster location when face up. For example, the bolster position values were more scattered (e.g., in a plot of height vs. bolster position) in the supine position. From testing, the minimum bolster position was 28 inches and the maximum bolster position was 48 inches.

Collectively (i.e., combining the prone values and supine values), this produces a minimum bolster position of 8 inches (e.g., from the prone position) and a maximum bolster position of 48 inches (e.g., from the supine position). In one example, the bolster used in testing had a height of 120 mm and a width of 813 mm with two recessed divots with a depth of 25 mm and a width of 75 mm to accommodate or otherwise cradle a user's legs. These measurements are merely exemplary and other values may be used (e.g., within ±10% the example measurements described above).

From testing, it was observed that the selected headrest extension value has a weak correction with a test subject's body height (i.e., data is scattered in a plot of height vs. headrest extension). Instead, it was observed that spine shape, posture, and other physical features play an important role in a comfortable headrest position (e.g., in terms of headrest height, headrest extension, and/or headrest tilt angle). When test subjects were in the prone position, they tended to achieve the same neutral position as when they stand. Also, different heights and/or shapes of people's forehead, chin, and cheek produced different headrest tilt angles.

Testing in the prone position resulted in a minimum of headrest height of −11 mm, a maximum headrest height of 8 mm, a minimum headrest extension of −17 mm, a maximum headrest extension of 0 mm, a minimum headrest tilt angle of −2°, and a maximum headrest tilt angle of 2° that satisfied most or all of the test subjects.

Testing in the supine position resulted in a minimum of headrest height of 4 mm, a maximum headrest height of 20 mm, a minimum headrest extension of −110 mm, a maximum headrest extension of 12 mm, a minimum headrest tilt angle of −6°, and a maximum headrest tilt angle of 6° that satisfied most or all of the test subjects.

Collectively (i.e., combining the prone values and supine values), this results in a minimum of headrest height of −11 mm, a maximum headrest height of 20 mm, a minimum headrest extension of −110 mm, a maximum headrest extension of 12 mm, a minimum headrest tilt angle of −6°, and a maximum headrest tilt angle of 6°.

Figure 5A:
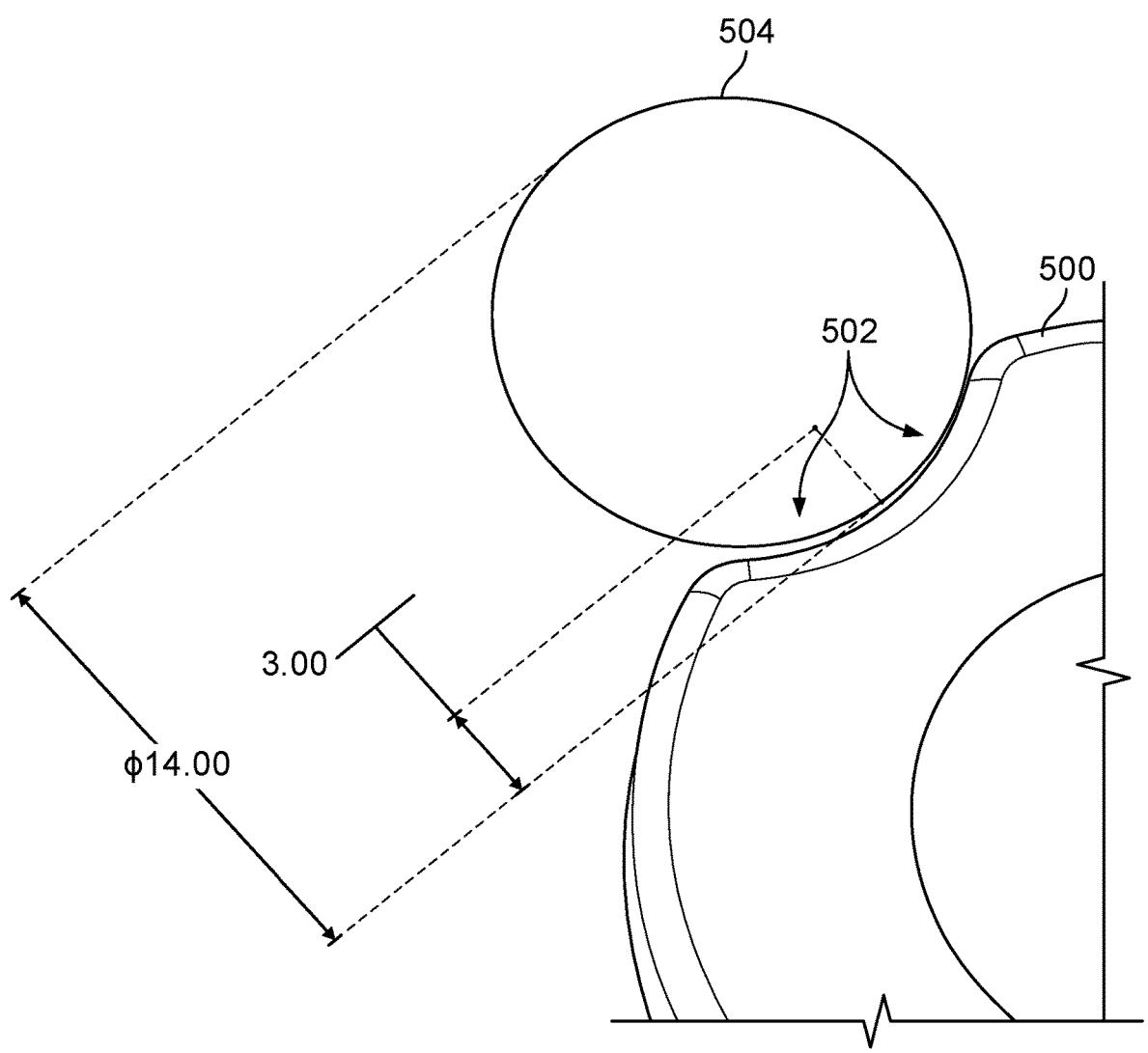
FIG. 5A is a diagram illustrating an embodiment of a platform (500) with a cutout (502) at the head-end of the platform.

Testing indicated that the headrest needed to be moved in (e.g., towards the platform where testing was performing using an earlier prototype) and overlapped with the head-end of the platform for some test subjects when in supine position, but this overlap is relatively minimal. See, for example, FIG. 5A. FIG. 5A is a diagram illustrating an embodiment of a platform (500) with a cutout (502) at the head-end of the platform. For context, the outline of the headrest (504) with a 14 inch diameter is shown and the height difference between the highest point of the cutout and the lowest point of the cutout is 41 mm.

Figure 5B:
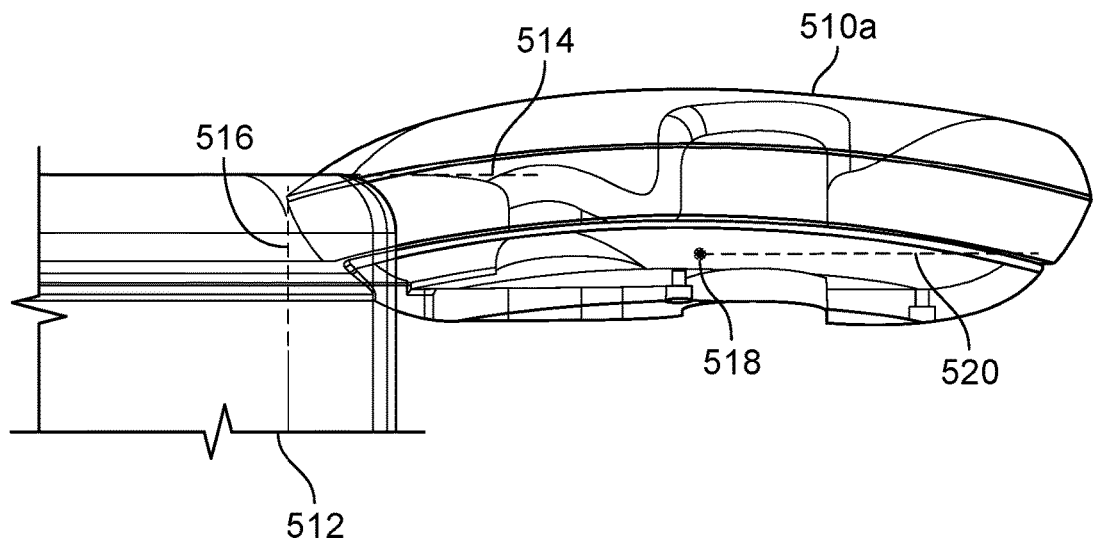
FIG. 5B is a diagram showing an embodiment of a headrest at a zero position.
Figure 5C:
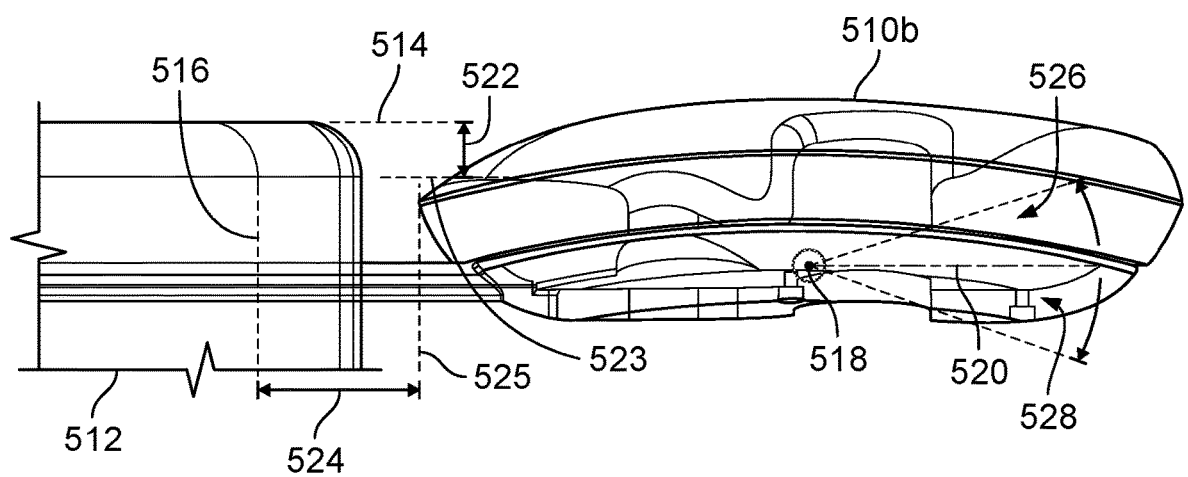
FIG. 5C is a diagram showing an embodiment of a headrest at a non-zero position.

FIGS. 5B and 5C show other example configurations of the headrest. FIG. 5B is a diagram showing an embodiment of a headrest at a zero position. In this example, the headrest (510a) has a headrest height at 0 inches, a headrest extension at 0 inches, and a headrest tilt angle at 0°. For context, the platform (512) is shown where the top surface of the platform (514) is used to measure the headrest height, the bottom of the cutout (516) is used to measure the headrest extension, and the horizontal axis of rotation (518) is where the headrest tilt angle is measured (see, for example, the zero angle (520)).

FIG. 5C is a diagram showing an embodiment of a headrest at a non-zero position. In this example, the headrest (510b) has a non-zero headrest height (522) as measured from the top surface of the platform (514) to the chinrest area on the top surface of the headrest (523).

The headrest (510b) also has a non-zero headrest extension (524) as measured from the bottom of the cutout (516) in the platform (512) to the foot and/or bottom end of the headrest (525). The headrest (510b) has a headrest tilt angle at the zero angle (520); positive tilt angles (526) and negative tilt angles (528) are also shown for reference relative to the horizontal axis of rotation (518) and the zero angle (520).

The following figures show other closeup and exterior views of a headrest embodiment.

Figure 6A:
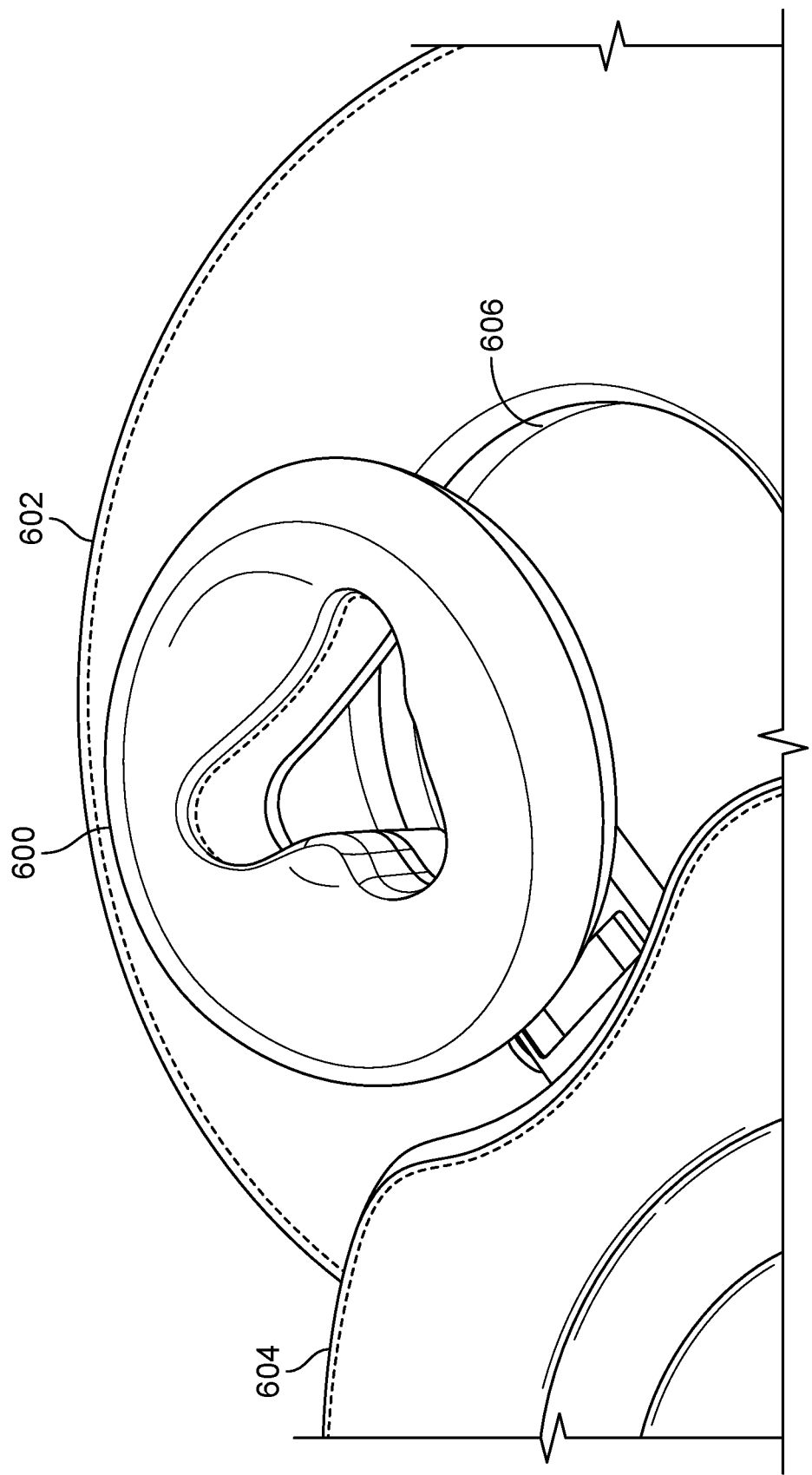
FIG. 6A is a diagram showing the exterior of a headrest embodiment from a downward perspective view.

FIG. 6A is a diagram showing the exterior of a headrest embodiment from a downward perspective view. From this view, the headrest (600), ring-shaped armrest (602), platform (604), and user interface (606), such as a touchscreen, are shown for this embodiment.

Figure 6B:
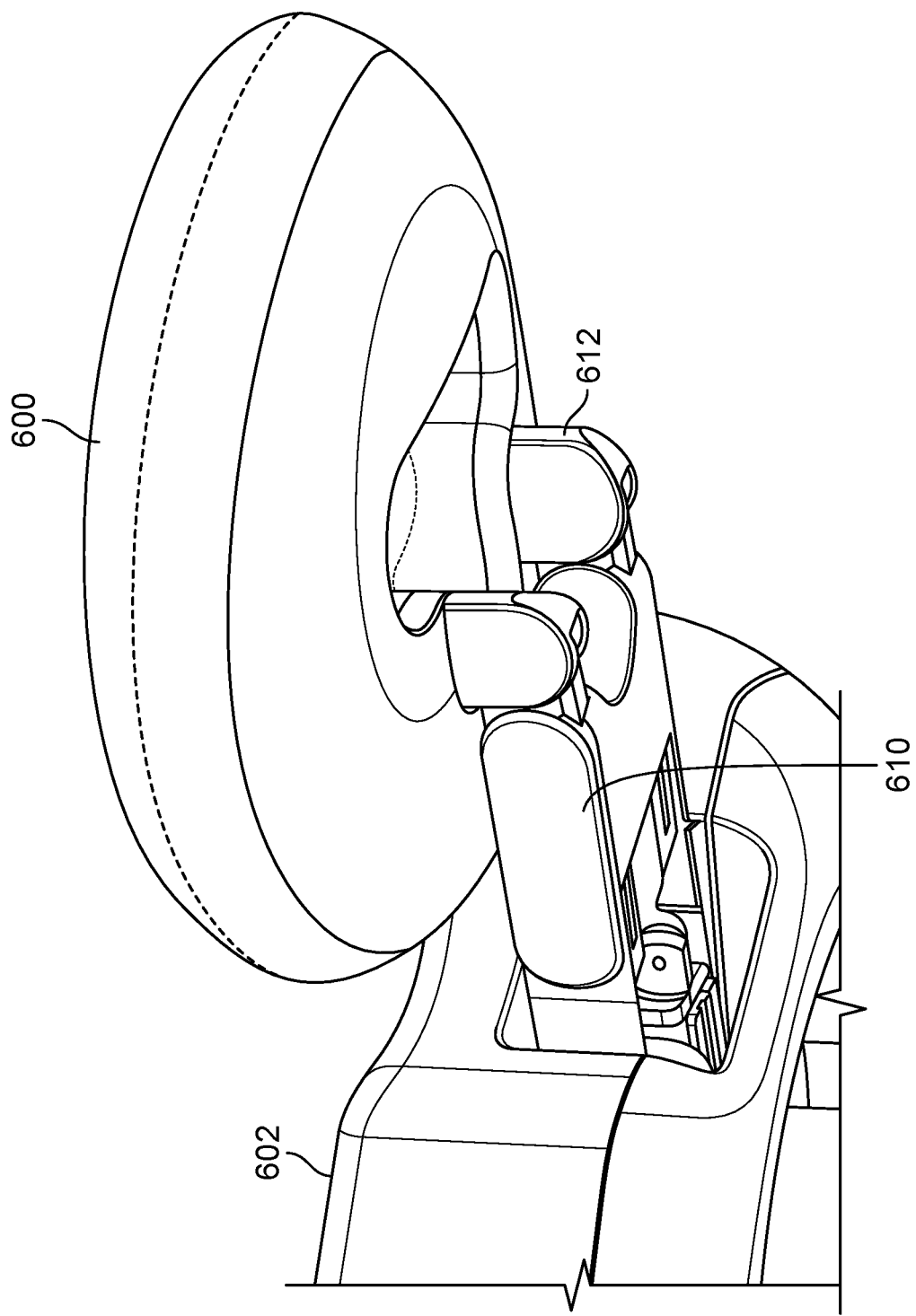
FIG. 6B is a diagram showing an exterior of a headrest embodiment from an upward perspective view.

FIG. 6B is a diagram showing an exterior of a headrest embodiment from an upward perspective view. In this example, the height and/or extension of the headrest (600) can be adjusted by lowering, raising, extending or retracting the horizontal headrest connector (610) where the one or more actuators are located inside the body of the platform (602). A vertical headrest connector (612) is moveably attached to the horizontal headrest connector (610), allowing the headrest to tilt.

In some embodiments, at least one part of an adjustable table system is able to expand or contract. The following figures show some examples of expandable (contractable) components in an adjustable table system.

Figure 7A:
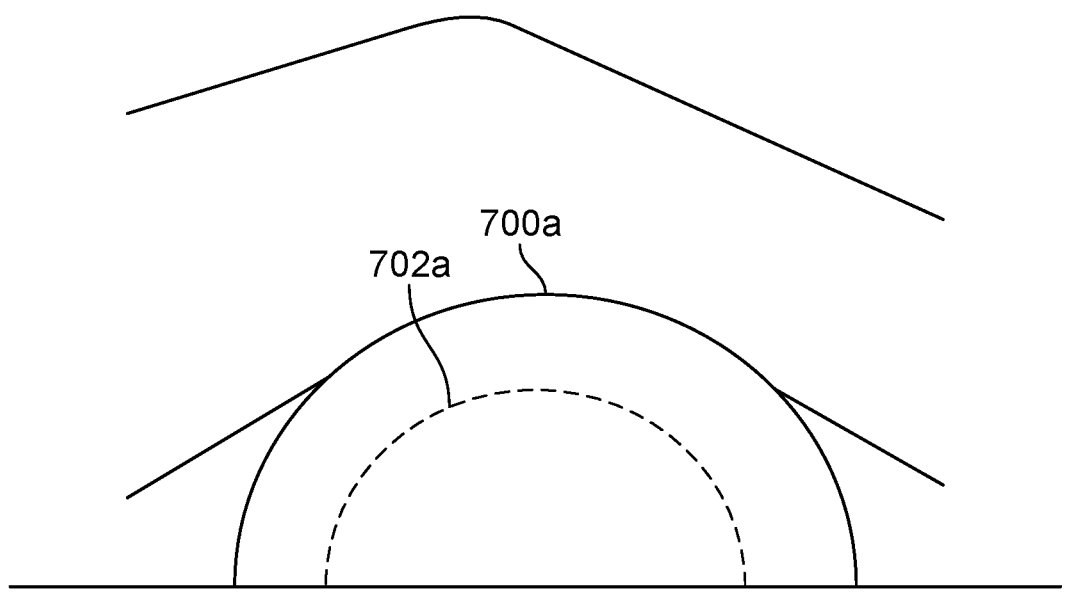
FIG. 7A is a diagram illustrating an embodiment of an expandable bolster in an expanded state with a massage recipient in a supine position.

FIG. 7A is a diagram illustrating an embodiment of an expandable bolster in an expanded state with a massage recipient in a supine position. In this example, the massage recipient is in a supine position and the bolster (700a) supports the back of the knees. In the supine position, a larger diameter (or, more generally, a larger size) is desired for the bolster (700a) because the volume of space under the knees when in a comfortable and/or massage-appropriate supine position is larger than the volume of space under the ankles when in a comfortable and/or appropriate prone position. Therefore, the expandable bolster (700a) is in the expanded state since the expandable bolster (700a) is currently supporting the back of the knees.

Figure 7B:
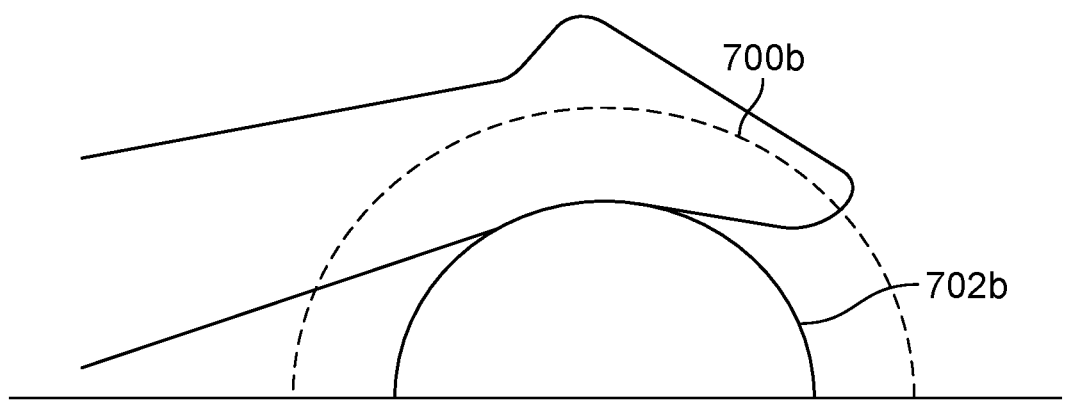
FIG. 7B is a diagram illustrating an embodiment of an expandable bolster in a contracted state with a massage recipient in a prone position.

FIG. 7B is a diagram illustrating an embodiment of an expandable bolster in a contracted state with a massage recipient in a prone position. In the prone position, the bolster (702b) supports the front of the ankles and a smaller bolster is desirable. Therefore, in this state, the expandable bolster (700b) is in the contracted state. For reference, FIG. 7A shows the contracted shape of the bolster (702a) and FIG. 7B shows the expanded shape of the bolster (700b).

In various embodiments, a variety of mechanical devices may be used to expand (contract) a bolster or other expandable (contractible) component. In one example, a bolster has a foam core in the shape of the contracted shape of the bolster (e.g., 702a and 702b) and an air bladder is used to expand the bolster to the expanded shape or size (e.g., 700a and 700b). For example, in the contracted shape or state (e.g., 702a and 702b) the air bladder would be deflated and in the expanded shape or state (e.g., 700a and 700b) the air bladder would be inflated.

Returning briefly to FIG. 4A, in some embodiments, the cutouts or indentations (408) in a bolster (404) are expandable (retractable) so that the size of the cutouts are adjustable. For example, when the bolster supports the ankles, a smaller cutout may be desirable. To support the knees (which tend to be larger than the ankles), a larger cutout may be desirable. To support the thighs (which tend to be larger than the knees), an even larger cutout may be desirable.

The following figures show an example of a retractable chest area in an adjustable table system.

Figure 8A:
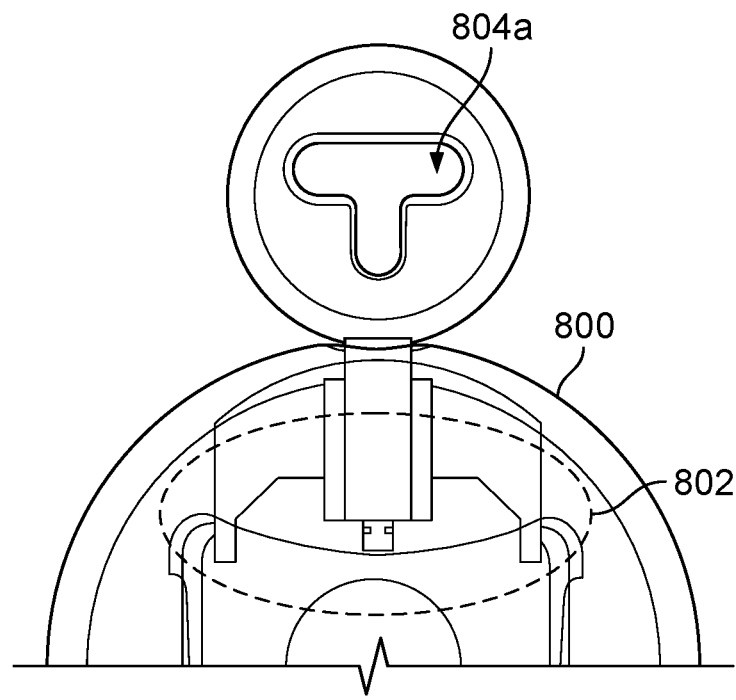
FIG. 8A is a diagram illustrating an embodiment of a platform with a retractable chest area shown from a top view.

FIG. 8A is a diagram illustrating an embodiment of a platform with a retractable chest area shown from a top view. For example, due to breast size, chest muscles, fatty tissue, and so on, some people may have larger and/or more prominent chests that make it uncomfortable to lie in a prone position on a flat surface for extended periods of time. In this example, the platform (800) includes a chest-area air bladder (802) that can be deflated (e.g., to a desired degree) to accommodate and/or provide more comfortable support for people with larger and/or protruding chests.

Figure 8B:
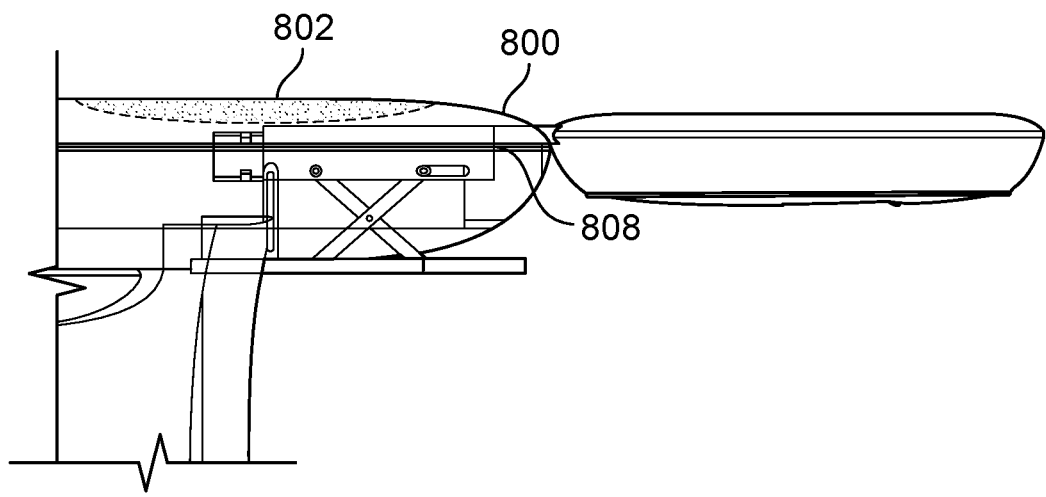
FIG. 8B is a diagram illustrating an embodiment of a platform with a retractable chest area shown from a side view.

FIG. 8B is a diagram illustrating an embodiment of a platform with a retractable chest area shown from a side view. In this example, the chest-area air bladder (802) is located above the headrest mechanism (808) in the body of the platform (800). As described above, the air bladder (802) can be deflated to create a depression or concavity on the top surface of the platform (800) in the chest area.

As shown in FIGS. 7A, 7B, 8A, and 8B, in some embodiments, at least one of the bolster, the headrest, or the arm interface is expandable, retractable, and/or contractable.

Returning briefly to FIG. 8A, in some embodiments, the face cradle (804a) is shaped and/or sized to accommodate people with eyeglasses. The following figure shows one example face cradle (i.e., cutout in a headrest) that accommodates eyeglasses.

Figure 8C:
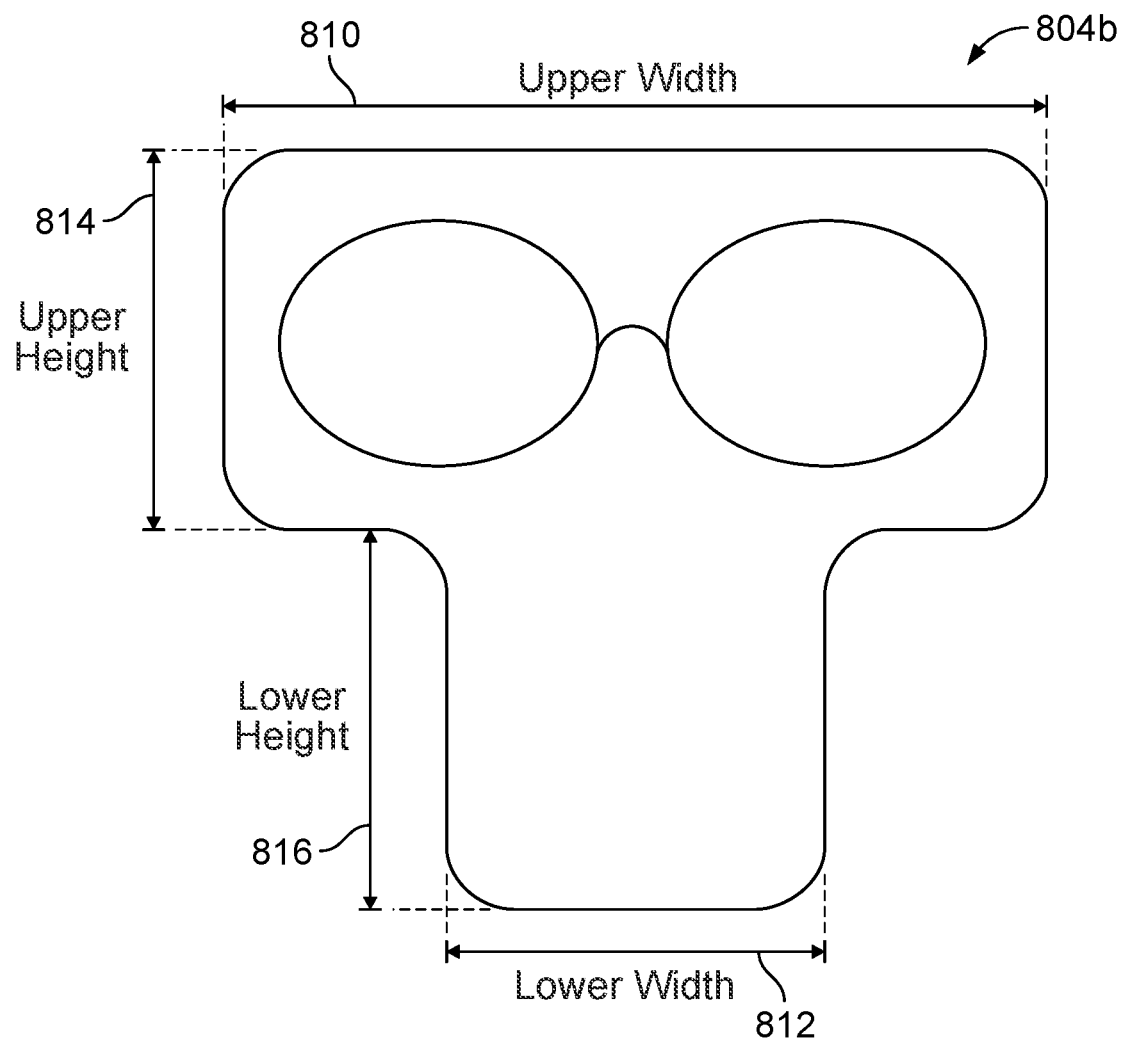
FIG. 8C is a diagram illustrating an embodiment of a face cradle with an eyeglass accommodation.

FIG. 8C is a diagram illustrating an embodiment of a face cradle with an eyeglass accommodation. In this example, the face cradle (804b) is T-shaped with rounded edges or corners.

In this example, the upper width (810) has a value within the range of 6-8 inches. In some applications, a larger value (e.g., closer to 8 inches) is desirable to accommodate larger eyeglasses.

The lower width (812) in this example has a value within the range of 2.25-2.75 inches. In some applications, a smaller value (e.g., closer to 2.25 inches) is desirable for better cheek and/or chin support.

In some embodiments, an arm interface includes a left-hand interface a right-hand interface that are independently movable. The following figures show one such embodiment.

Figure 9A:
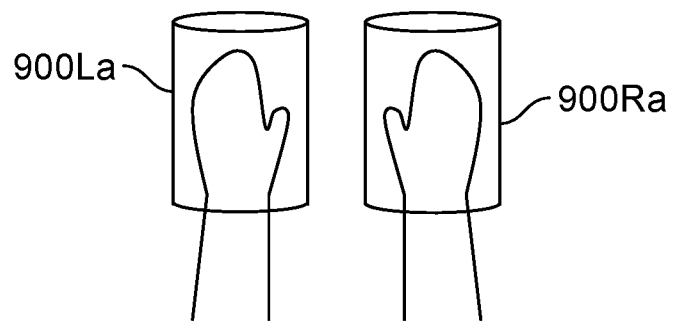
FIG. 9A is a diagram illustrating an embodiment of a left-hand sleeve and a right-hand sleeve.

FIG. 9A is a diagram illustrating an embodiment of a left-hand sleeve and a right-hand sleeve. In this example, a left hand is inserted into the left-hand sleeve (900La) and a right hand is inserted into the right-hand sleeve (900Ra). The two sleeves (900La and 900Ra) are independently moveable and can be moved to position the massage recipient into a desired position. Some examples are described below.

Figure 9B:
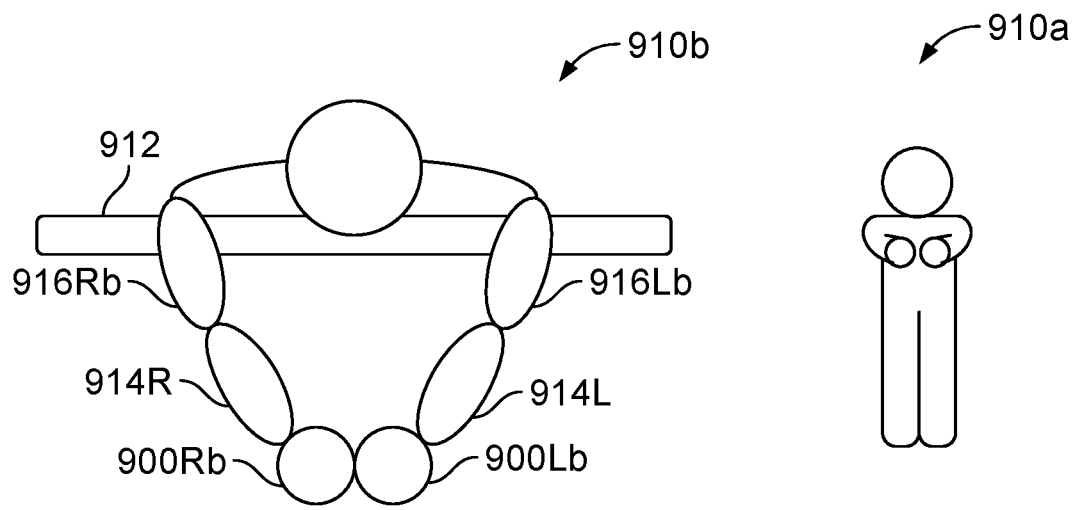
FIG. 9B is a diagram illustrating an embodiment of a left-hand sleeve and a right-hand sleeve with a massage recipient in a first position.

FIG. 9B is a diagram illustrating an embodiment of a left-hand sleeve and a right-hand sleeve with a massage recipient in a first position. In this example, diagram 910*a* (at right) shows an unobstructed view of the massage recipient without the platform (912) or other parts of the adjustable massage table system shown. As diagram 910*a* shows, the massage recipient has their forearms and upper arms extended forward at chest height with their hands together.

Diagram 910*b* (at left) shows the massage recipient lying in a prone position on the platform (912) in the same position. As shown in diagram 910*b*, their left and right forearms (914L and 914R) and left and right upper arms (916Lb and 916Rb) are extended forward at chest height. In this example, the left-hand sleeve (900Lb) and right-hand sleeve (900Rb) have been moved into this position (e.g., along a longitudinal axis and/or a vertical axis) to guide the massage recipient into the position.

Figure 9C:
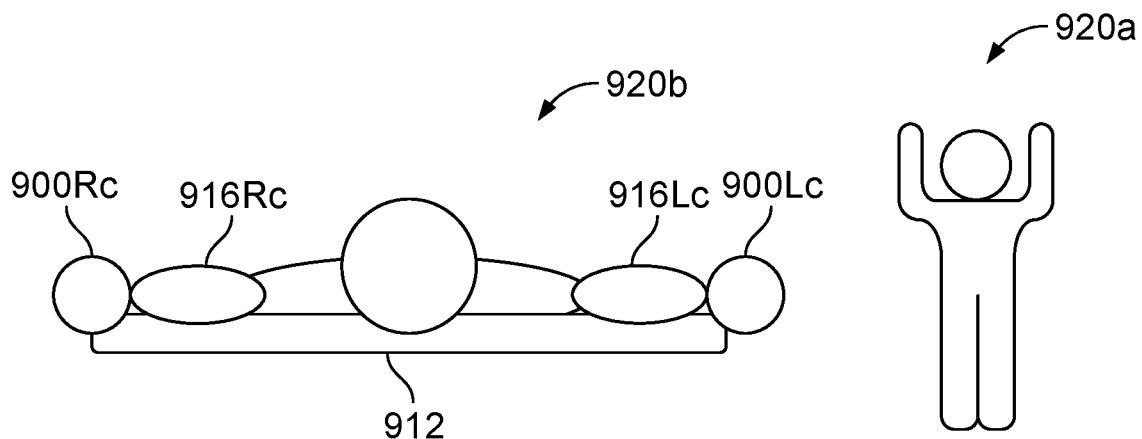
FIG. 9C is a diagram illustrating an embodiment of a left-hand sleeve and a right-hand sleeve with a massage recipient in a second position.

FIG. 9C is a diagram illustrating an embodiment of a left-hand sleeve and a right-hand sleeve with a massage recipient in a second position. Diagram 920*a* (at right) shows an unobstructed view of the massage recipient's positioning: upper arms extended laterally at shoulder height with forearms extended upwards (e.g., creating a U shape with their arms).

Diagram 920*b* (at left) shows the massage recipient lying in a prone position on the platform (912) with the upper arms (916Lc and 916Rc) extended laterally at shoulder height; the left-hand sleeve (900Lc) and right-hand sleeve (900Rc) are substantially at the same height as the platform (912). The forearms are not visible from this view and for this body position. In this example, the left-hand sleeve (900Lc) and right-hand sleeve (900Rc) have been moved into this position (e.g., along a longitudinal axis and/or a vertical axis) to guide the massage recipient into the position.

In some applications, an arm interface with two independently moveable components (e.g., a left-hand sleeve and a right-hand sleeve) is desirable and/or attractive because it can more effectively and/or efficiently position a massage recipient into a desired position to expose muscles in the back and/or shoulder for treatment. It is noted that other types of interfaces (e.g., hand grips, etc.) may be used and the technique is not necessarily limited to sleeve-type embodiments.

As described above, in some embodiments, an adjustable massage table system includes robotic arms so that the table can perform an automated and/or robotic massage (e.g., without a massage therapist present). The following figures describe some embodiments of an adjustable massage table system that is used in such an application.

Figure 10:
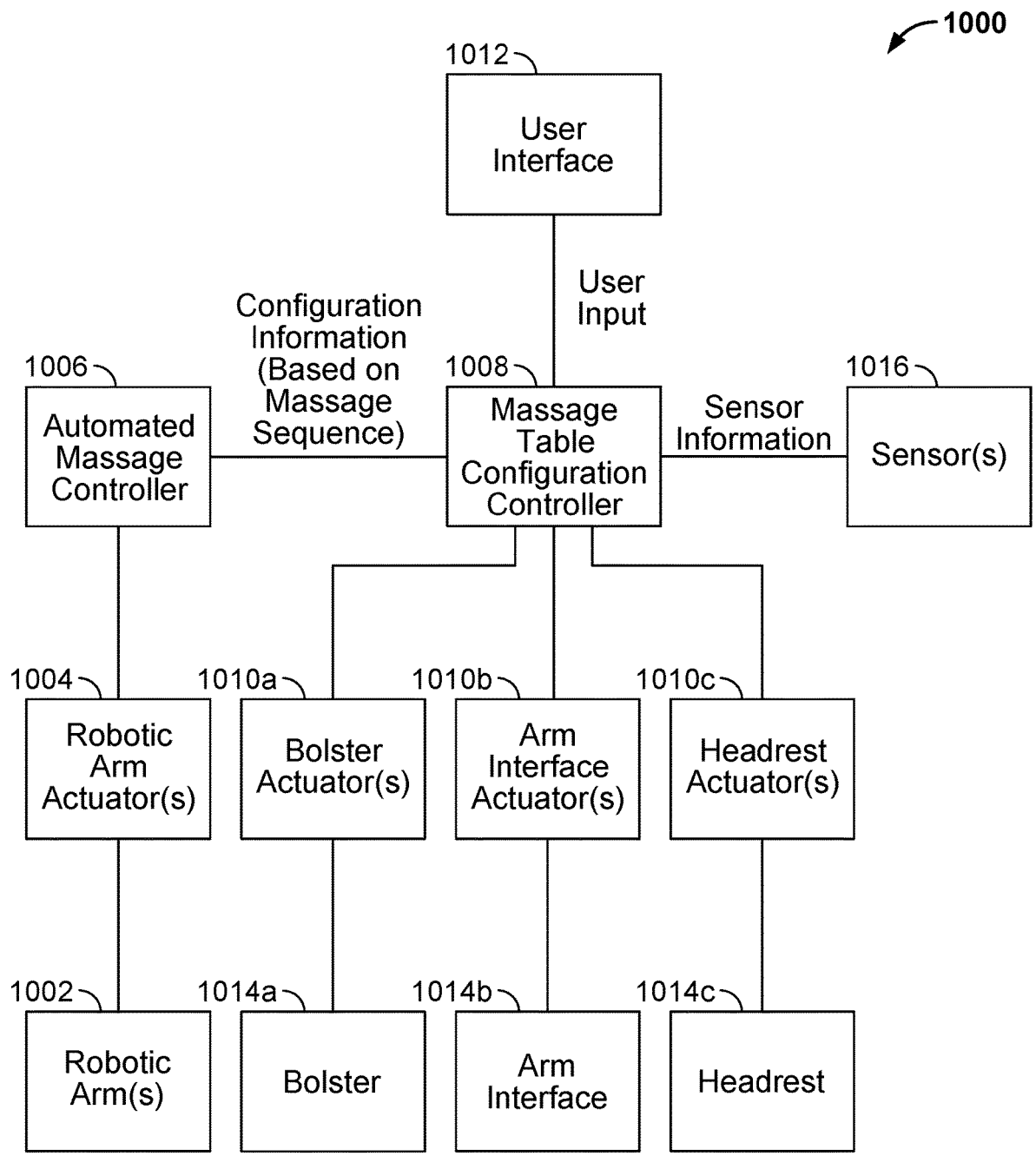
FIG. 10 is a block diagram illustrating an embodiment of an adjustable massage table system with robotic arms that are controlled by an automated massage controller.

FIG. 10 is a block diagram illustrating an embodiment of an adjustable massage table system with robotic arms that are controlled by an automated massage controller. In this example, the block diagram of the exemplary adjustable massage table system (1000) is similar to the block diagram shown in FIG. 2; for brevity, descriptions of the same or similar modules and/or features are not repeated here.

In this example, the adjustable massage table system (1000) includes one or more robotic arms (1002) that are moved and/or positioned by one or more robotic arm actuators (1004). For example, the automated massage controller (1006) determines an automated massage sequence (e.g., a sequence of various massage treatments where each massage treatment in the sequence has a different targeted body part or repeats a flow of robotic arm movements that is not necessarily targeted to a specific body part and/or region). For example, the first massage treatment in a sequence of treatments may be directed to the shoulders with the massage recipient in a prone position, the second massage treatment in the sequence may be directed to the neck with the massage recipient in a prone position, and so on and the automated massage controller (1006) will generate appropriate control signals for the robotic arm actuator(s) (1004) based on the current massage treatment in the sequence.

Before the robotic arms (1002) begin performing each massage treatment in an automated massage sequence, the bolster, arm interface, and headrest (1014*a*-1014*c*) are positioned appropriately for a particular massage treatment. In one example, the automated massage controller (1006) and massage table configuration controller (1008) exchange configuration information (e.g., based on the automated massage sequence) in the form of predefined configurations. In one example, the configuration information exchanged is: prone_position_1, prone_position_2, and so on and supine_position_1, supine_position_2, and so on.

This configuration information from the automated massage controller (1006) and the sensor information from the one or more sensors (1016) are used to generate control signals for the actuator(s) (1010*a*-1010*c*) which in turn position the bolster (1014*a*), arm interface (1014*b*), and headrest (1014*c*) into positions and/or configurations that are appropriate for the body shape and/or size of the massage recipient as well as the current target body part in the massage sequence.

In one example, the sensor(s) (1016) include a depth-sensing camera so that the sensor information (which is passed to the massage table configuration controller (1008)) includes a 3D outline of the massage recipient. Using the 3D outline, control signals for the actuators (1010*a*-1010*c*) are generated accordingly.

In one example automated massage sequence, the massage recipient should be in the prone position for the first treatment to the shoulders; the arms and/or shoulders may also need to be in a specific position and control signals for the bolster actuator(s), arm interface actuator(s), and/or headrest actuator(s) (1010*a*-1010*c*) are generated that put the massage recipient into the proper position. In some embodiments, a speaker (e.g., included in and/or associated with the adjustable massage table system) outputs an audio message and/or the user interface (1012), such as a touchscreen, displays a video with instructions for the massage recipient.

As or if desired, the user may adjust the bolster, arm interface, and/or headrest (1014*a*-1014*c*) using the user interface (1012) throughout the automated massage. For example, automated massage controller (1006) may have a period for the massage recipient to fine tune the configuration of the table (e.g., via the user interface (1012)) before the robotic arms (1002) begin the massage therapy. Also, during the massage, a massage recipient may be able to adjust the configuration of the table using the user interface (1012) (e.g., during testing, test subjects became uncomfortable after being in the same position for extended periods of time).

It may be helpful to show an example of robotic arm(s) (1002) which in some embodiments are part of an adjustable table system (e.g., 1000). The following figures show an example of robotic arms.

Figure 11A:
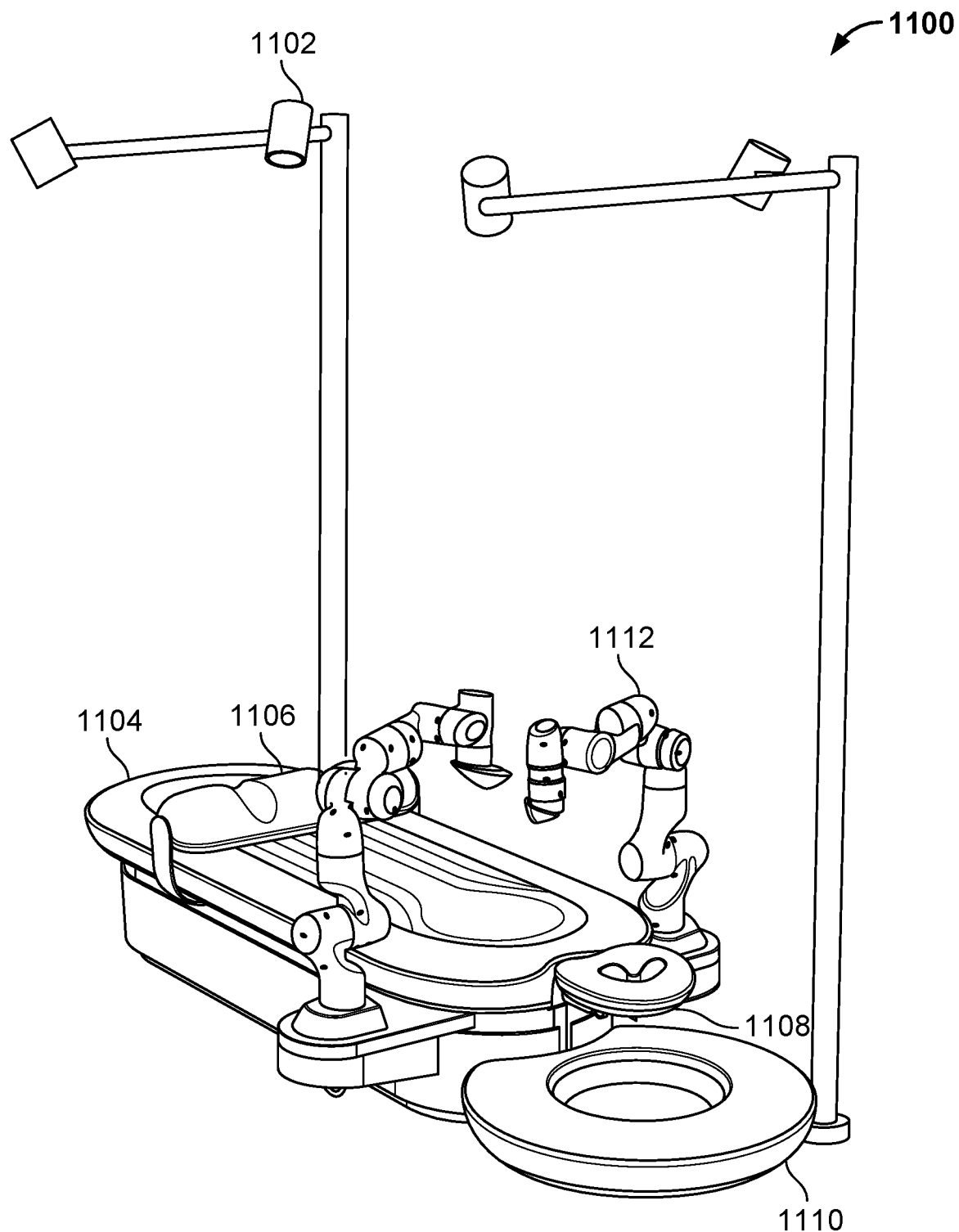
FIG. 11A is a diagram illustrating an embodiment of an adjustable massage table with robotic arms from a perspective view.

FIG. 11A is a diagram illustrating an embodiment of an adjustable massage table with robotic arms from a perspective view. The example of FIG. 11A is similar to the example shown in FIG. 4A and for brevity, descriptions of the same or similar components and/or features are not repeated here.

In this example, the adjustable massage table system (1100) includes four depth-sensing cameras (1102) mounted above the platform (1104). These cameras (1102) are one example of sensors that may be used to automatically position and/or configure the bolster (1106), headrest (1108), and/or armrest (1110). In some embodiments, the cameras (1102) may also be used to generate real-time images of the massage recipient that are presented in a display and/or touchscreen (e.g., in the center of the ring-shaped armrest (1110)).

In this example, the adjustable massage table system (1100) also includes two robotic arms (1112) that are mounted or otherwise connected to the rest of the adjustable massage table system (1100) beneath the platform (1104). In some other embodiments (not shown here), a robotic arm is independent, free-floating, and/or not connected to an adjustable massage table system.

Figure 11B:
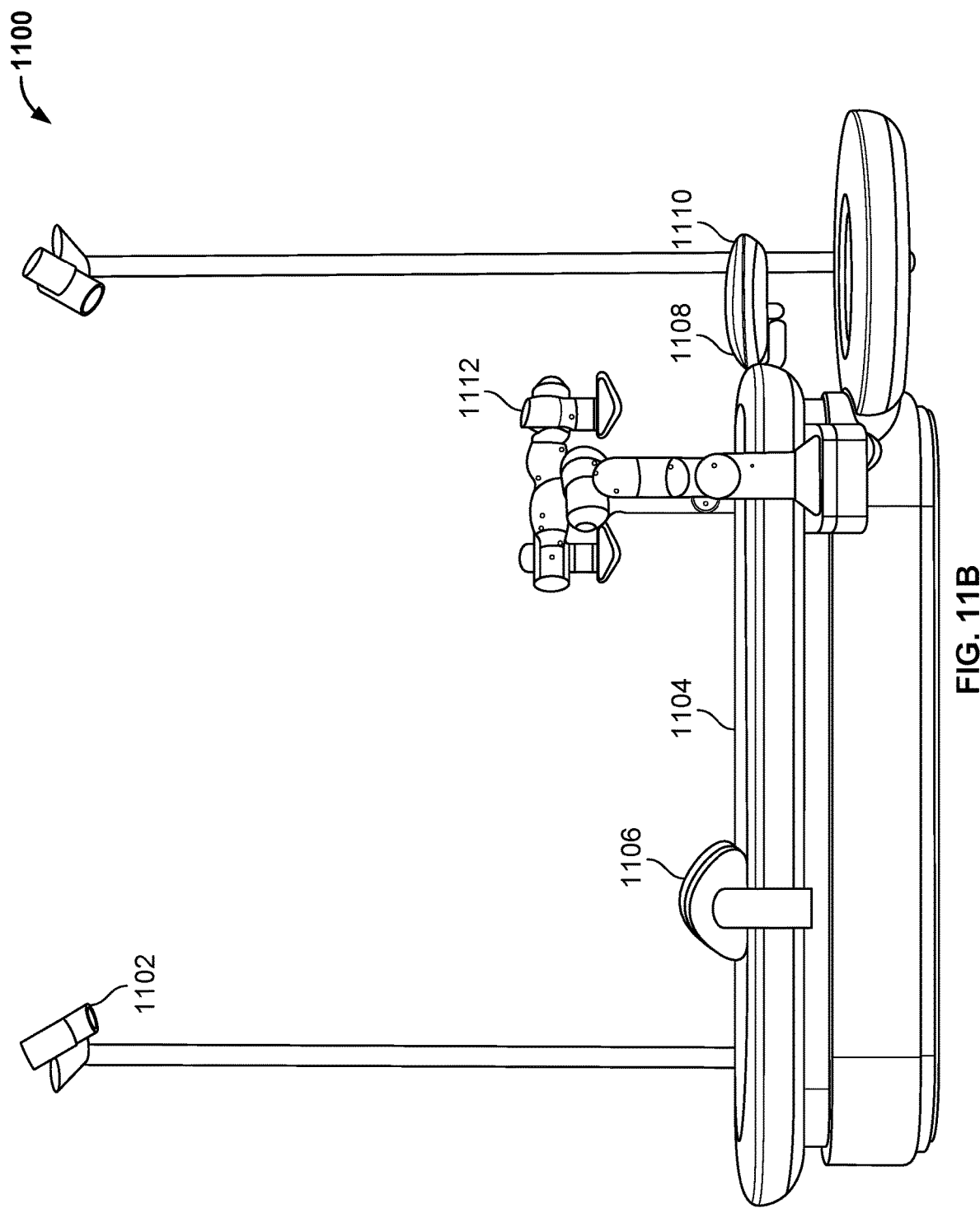
FIG. 11B is a diagram illustrating an embodiment of an adjustable massage table with robotic arms from a side view.

FIG. 11B is a diagram illustrating an embodiment of an adjustable massage table with robotic arms from a side view. In this example, the depth-sensing cameras (1102), the platform (1104), the bolster (1106), the headrest (1108), the armrest (1110), and the robotic arms (1112) in the adjustable massage table system (1100) are seen from the side.

In some embodiments (see, e.g., FIGS. 11A and 11B), the input includes sensor information generated by a depth-sensing camera located above a platform; and generating the control signal includes determining a height of a massage recipient based at least in part on the sensor information.

In some embodiments (see, e.g., FIGS. 11A and 11B), the input includes sensor information generated by a depth-sensing camera that is separate from a massage table system, wherein the depth-sensing camera is connected to one or more of the following: a kiosk or a wall; and generating the control signal includes determining a height of a massage recipient based at least in part on the sensor information.

With robotic arms, it is possible for an adjustable massage table system (e.g., FIGS. 11A and 111B) to be deployed in an environment where there is no massage therapist or room attendant present to help adjust the table. For example, an adjustable massage table system with robotic arms may reside in an unattended gym in an apartment building where residents have 24-hour access. These unattended applications require new interfaces and/or techniques for configuring an adjustable massage table system (e.g., into a comfortable position and/or to expose a target body part) without the aid of a massage therapist or room attendant, and the embodiments described herein provide that capability.

In some embodiments, an automated massage system includes features to prevent collisions and/or overlaps (e.g., associated with workspaces and/or regions of travel). For example, the exemplary adjustable massage table system (1100) shown in FIGS. 11A and 11B includes multiple moving and/or adjustable elements or components where the workspace or available area of travel for the associated axes overlap. For example, the headrest and armrest, as well as the bolster with the linear rails moving the bases of the arms, overlap. This overlap is needed to accommodate a wide variety of body types and/or sizes. However, this overlap can result in collisions and/or pinch points (e.g., a leg pinned between the bolster and base of the robot arm or the user's arm getting stuck between the arm rest and headrest).

In some embodiments, a controller (e.g., massage table configuration controller (214) in FIG. 2) is aware of the location of each element (e.g., the bolster (202), the arm interface (204), and headrest (206) in FIG. 2) at all times and performs collision detection and avoidance, for example by dynamically limits the range of travel (e.g., for a given component based on the position or location of other elements or components) to ensure that a collision and/or pinch point event does not occur.

In one example where collision avoidance is implemented using via simple and/or straightforward techniques, a hard limit on the range of travel for all axis is dynamically set or otherwise enforced using bounding boxes, such as (e.g., spatial) buffers, around each element or component. For example, there may be a bounding box around the bolster (404) in FIG. 4A where other components or elements of the table system are not permitted to be in the bounding box (and vice versa).

In a more sophisticated example, a controller considers or otherwise takes into account if the adjustment of one element should result in or otherwise prompt the automatic movement of another. For example, when an automated massage system is not giving a massage and the user is adjusting the bolster position, the system may automatically adjust the position of the linear rail to prevent collisions. The result is a more streamlined user experience versus an alternative where the bolster adjustment fails and the user must move the robot arms manually before completing the adjustment of the bolster. These behaviors become more complex when the automated massage system is giving a massage using the robotic arms while the bolster is being moved. In this case, the adjustment of the bolster may trigger automatic adjustments to a robotic arm's base position (in at least some embodiments).

In some embodiments, knowledge or information about the overlapping workspaces can come from CAD as well as perception or inspection. In some embodiments, collision detection and/or avoidance is performed using via current, torque, and/or force sensing.

As described above, in some embodiments, a processor (e.g., massage table configuration controller (214) in FIG. 2) enforces collision avoidance between two or more of the bolster, the headrest, and the arm interface, including by monitoring, in real time, a bolster position, a headrest position, and an arm interface position.

Figure 12:
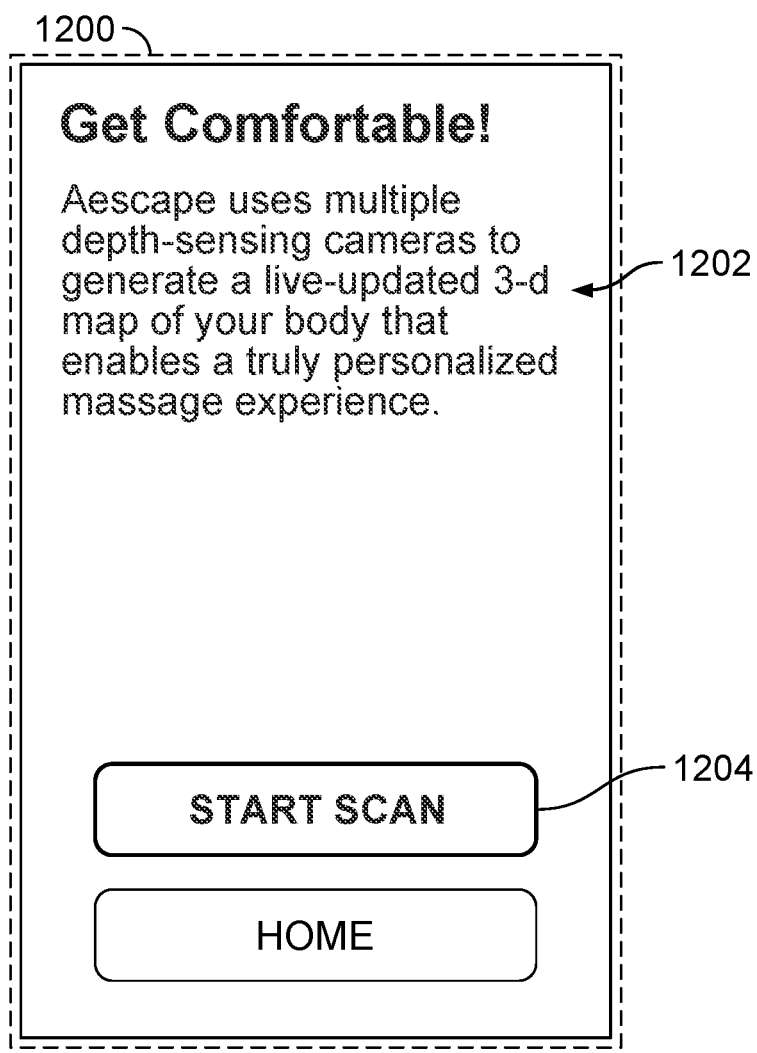
FIG. 12 is a diagram illustrating an embodiment of a display presented in a touchscreen to initiate a scan.

FIG. 12 is a diagram illustrating an embodiment of a display presented in a touchscreen to initiate a scan. In this example, the display (1200) includes a displayed text (1202), "Get comfortable! Aescape uses multiple depth-sensing cameras to generate a live-updated 3-d map of your body that enables a truly personalized massage experience."

The display (1200) also includes a Start Scan button (1204) which may initiate the scan which in turn generates sensor information which in turn is used to automatically configure and/or position the components of an adjustable massage table system (e.g., bolster, headrest, arm interface, etc.). In some embodiments, Start Scan button (1204) also initiates a display to present audio and/or visual instructions or information to the massage recipient related to getting the massage recipient into a proper or desired position, and/or adjusting the components of the adjustable massage table system into one that is comfortable for the massage recipient and appropriate for the (next) massage therapy.

In some embodiments, additional controls are presented. For example, the controls shown in the example of FIG. 3 may be displayed so that a user can fine-tune the positioning, as or if needed (e.g., before and/or during an automated massage).

Returning briefly to FIGS. 11A and 111B, in some embodiments, a sensor (e.g., a depth-sensing camera) is located in a different position (i.e., not above the platform). The following figure shows one such example.

Figure 13:
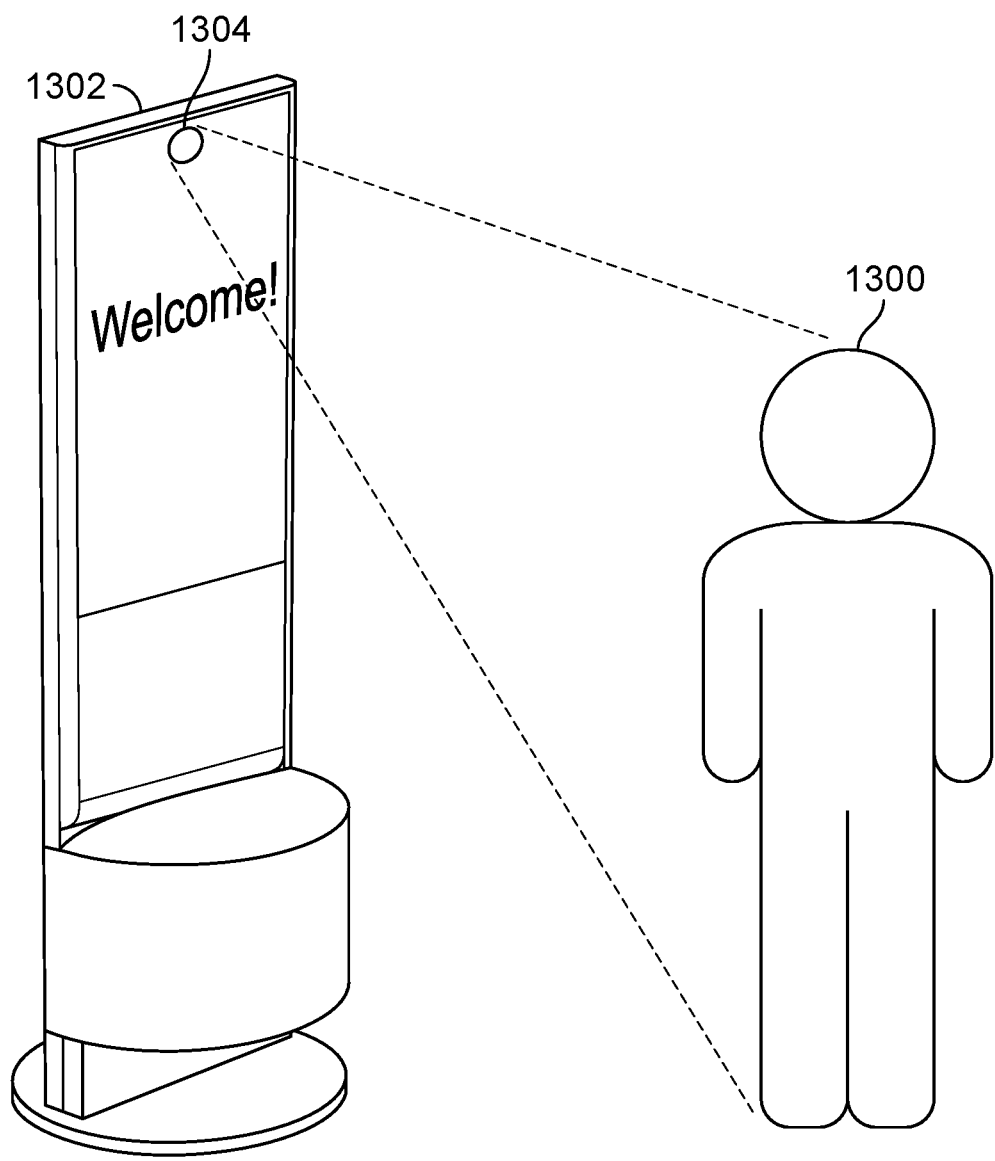
FIG. 13 is a diagram illustrating an embodiment of a kiosk with one or more depth-sensing cameras.

FIG. 13 is a diagram illustrating an embodiment of a kiosk with one or more depth-sensing cameras. In this example, a massage recipient (1300) checks in at a kiosk (1302) which includes one or more depth-sensing cameras (1304). In one example application, multiple adjustable massage table systems are deployed at a location (e.g., a spa) where each adjustable massage table system is in its own room. The kiosk (1302) may be placed in the lobby so that a massage recipient (1300) can check-in and be assigned to one of the rooms by the kiosk.

As part of the check-in process, the kiosk (1302) scans the massage recipient (1300) using the depth-sensing camera(s) (1304) to produce sensor information. This sensor information may be then passed to the assigned adjustable massage table system and used to configure the adjustable massage table system.

In some embodiments, it may be desirable to have multiple depth-sensing camera(s) (e.g., in a kiosk, attached to an adjustable massage table system, or elsewhere). For example, this may produce more accurate sensor information and/or a better-quality image of the massage recipient (e.g., which is presented via a display during the automated massage).

In various embodiments, adjustments to the various components of an automated massage system are permitted (or not) at various times or states associated with the automated massage system. In general, for a motion system operating around people, an important consideration is how and/or when movement is enabled or otherwise permitted. For example, an operator can (in one example) remotely set up the position of each of the various (e.g., ergonomic) adjustments. This, for example, may be done via a concierge application where the (e.g., remote) attendant uses a tablet device (e.g., that is not physically connected to the automated massage system) to set up the automated massage system for the next massage or user. While this is operationally convenient, it also presents risks if allowed while a user someone is actively being massaged on an automated massage (table) system. The controller (in this example at least) determines whether adjustments are allowed or otherwise permitted based at least in part on the origin of the request (e.g., remote attendant vs. user) and the state of the massage (e.g., automated massage is currently being provided or not).

Similarly, in some embodiments, a controller determines whether (e.g., ergonomic) adjustments that are specified or otherwise input by a user are permitted at that particular time or state. For example, while robotic arms are massaging a user's calves, it may be desirable to prevent the user from adjusting the bolster position (e.g., via an armrest touchscreen or tablet). Adjusting the bolster while the values are being massaged can lead to discomfort and/or injury. On the other hand, we may allow adjustments of the bolster during the massage while we are massaging the upper back.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor that:
receives an input associated with configuring at least one of a bolster, a headrest, or an arm interface;
generates a control signal based at least in part on the input; and
controls an actuator using the control signal to adjust a configuration of the at least one of the bolster, the headrest, or the arm interface;
the bolster;
the headrest; and
the arm interface, wherein the arm interface includes a ring-shaped armrest with a touchscreen in the center of the ring-shaped armrest.

2. The system of claim 1, wherein:
the input includes user input; and
generating the control signal is based at least in part on the user input.

3. The system of claim 1, wherein:
the input includes sensor information; and
generating the control signal is based at least in part on the sensor information.

4. The system of claim 1, wherein:
the input includes configuration information associated with an automated massage sequence; and
generating the control signal is based at least in part on the configuration information associated with the automated massage sequence.

5. The system of claim 1, wherein:
the input includes a user credential; and
generating the control signal is based at least in part on the user credential.

6. The system of claim 1, wherein the headrest is linearly moveable along a longitudinal axis, is linearly moveable along a vertical axis, and is rotatable about a horizontal axis of rotation.

7. The system of claim 1, wherein at least one of the bolster, the headrest, or the arm interface is expandable or retractable.

8. The system of claim 1, wherein the headrest includes a T-shaped face cradle with rounded edges.

9. The system of claim 1, wherein the arm interface includes two or more independently moveable components.

10. The system of claim 1, wherein the arm interface includes two or more independently moveable components, including a left-hand sleeve and a right-hand sleeve.

11. The system of claim 1, wherein:
the input includes sensor information generated by a depth-sensing camera located above a platform; and
generating the control signal includes determining a height of a massage recipient based at least in part on the sensor information.

12. The system of claim 1, wherein:
the input includes sensor information generated by a depth-sensing camera that is separate from a massage table system, wherein the depth-sensing camera is connected to one or more of the following: a kiosk or a wall; and
generating the control signal includes determining a height of a massage recipient based at least in part on the sensor information.

13. The system of claim 1 further including a platform with a retractable chest area.

14. The system of claim 1, wherein the headrest includes a cutout for eyeglasses.

* * * * *